Oct. 26, 1954  W. M. HOUGHTON  2,692,539
MEASURING AND MARKING MACHINE FOR SHEET MATERIAL
Filed April 5, 1951  13 Sheets-Sheet 1

Inventor
William M. Houghton
By his Attorney
Thomas J. Ryan

Oct. 26, 1954  W. M. HOUGHTON  2,692,539
MEASURING AND MARKING MACHINE FOR SHEET MATERIAL
Filed April 5, 1951  13 Sheets-Sheet 2
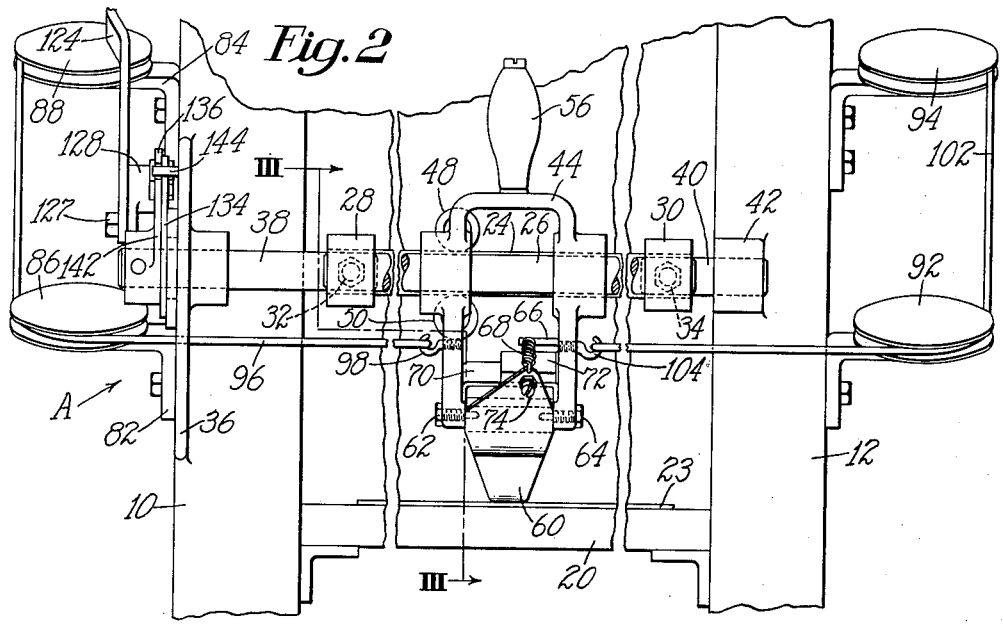
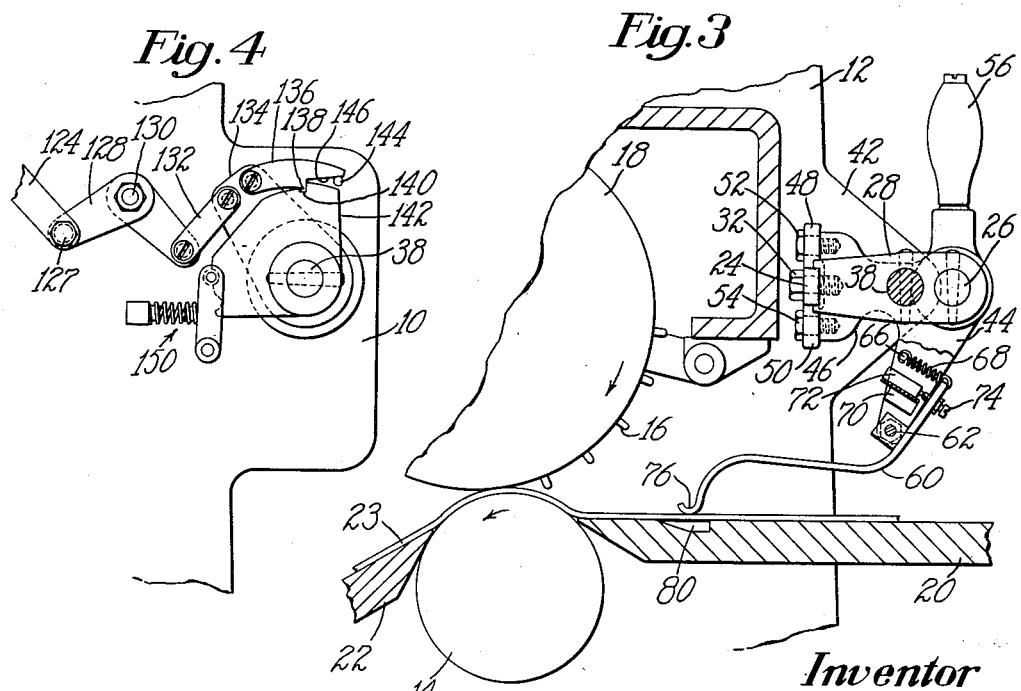
Inventor
William M. Houghton
By his Attorney
Thomas J. Ryan.

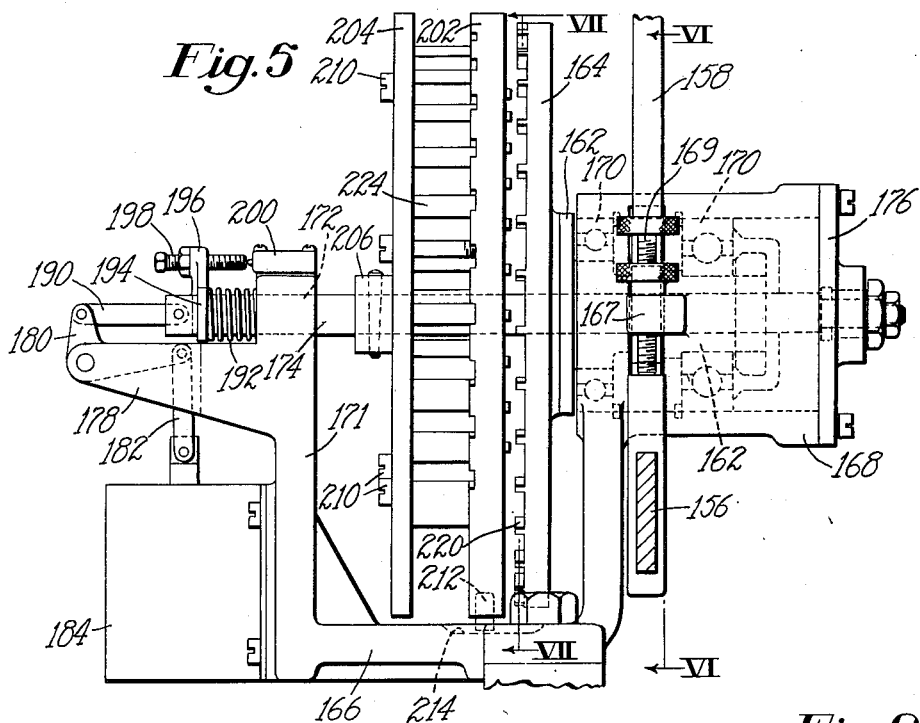
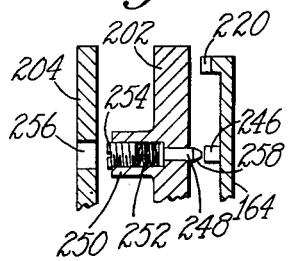
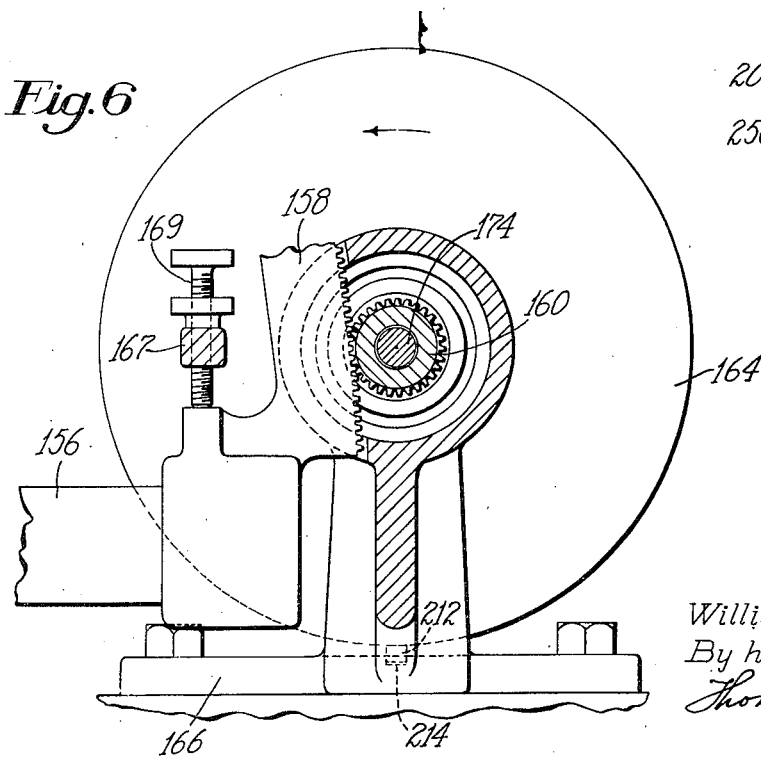
Inventor
William M. Houghton
By his Attorney
Thomas Ryan

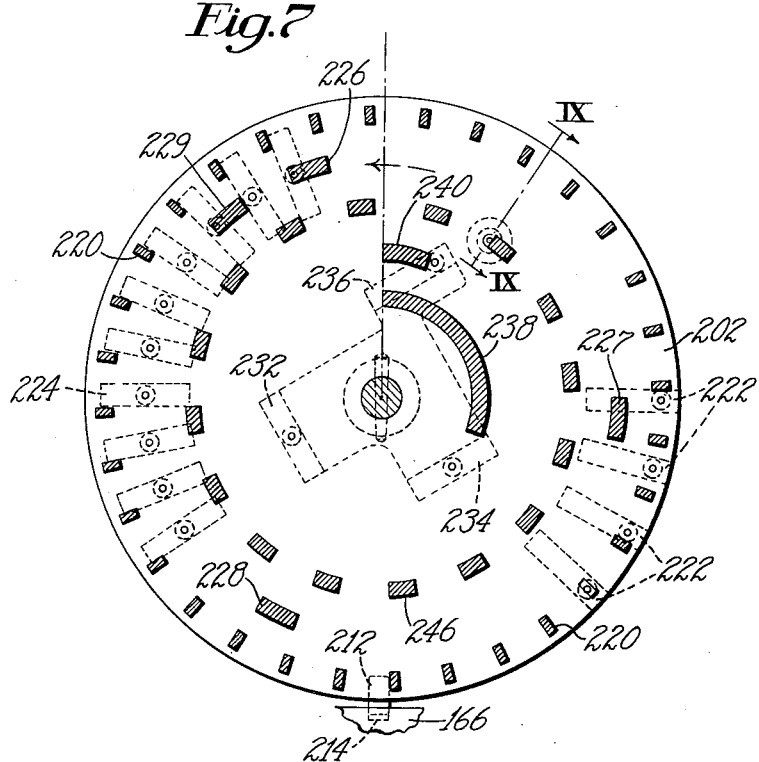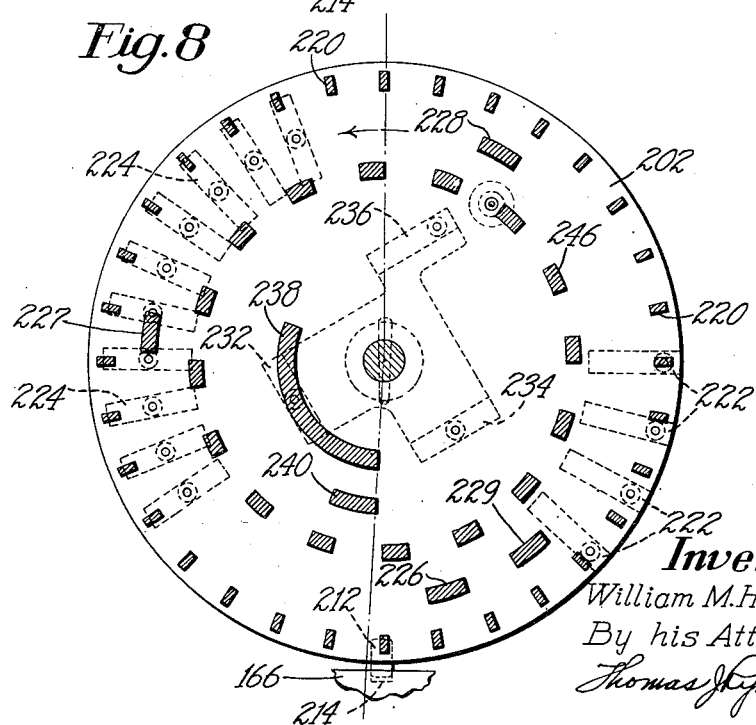

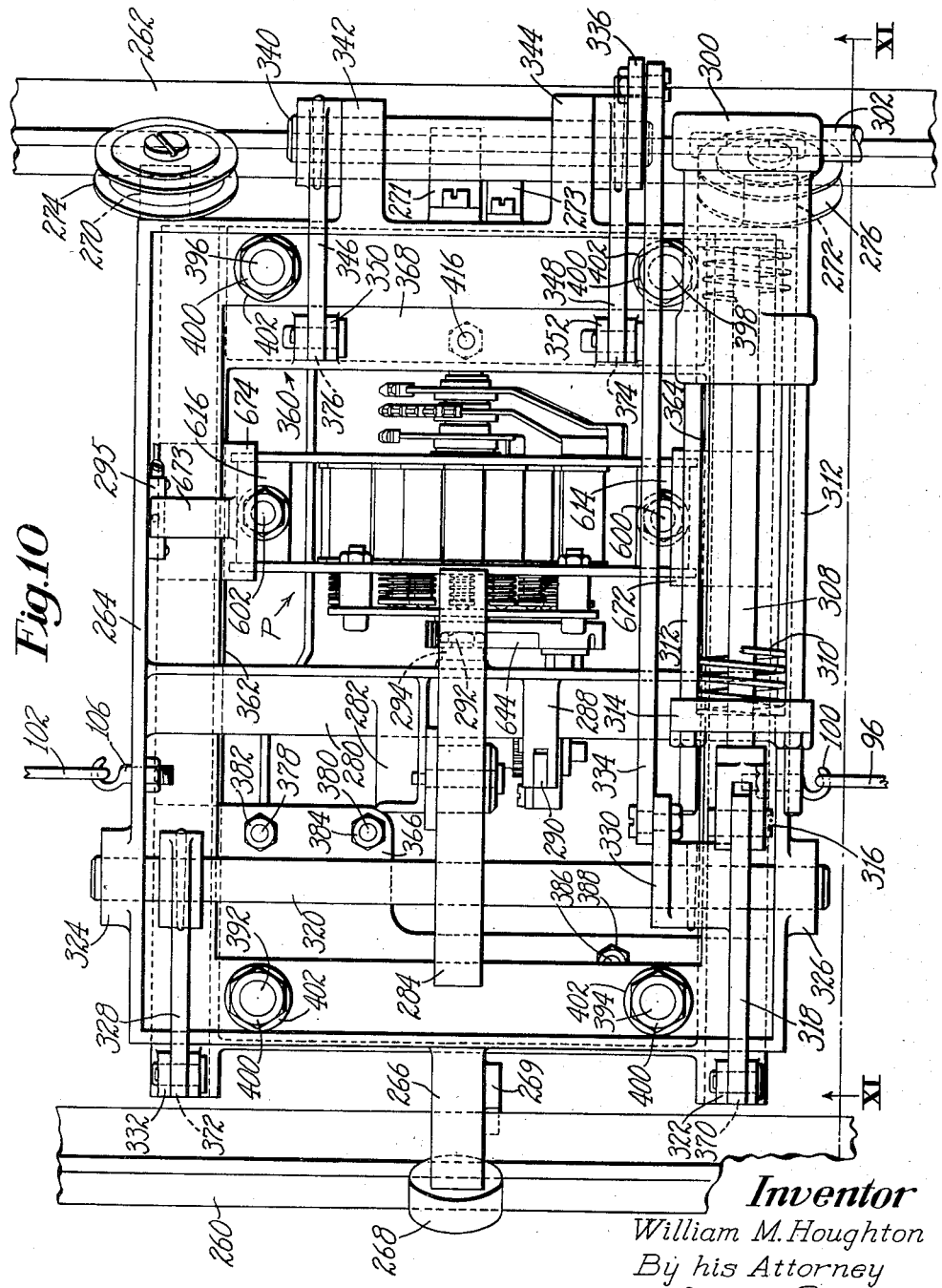

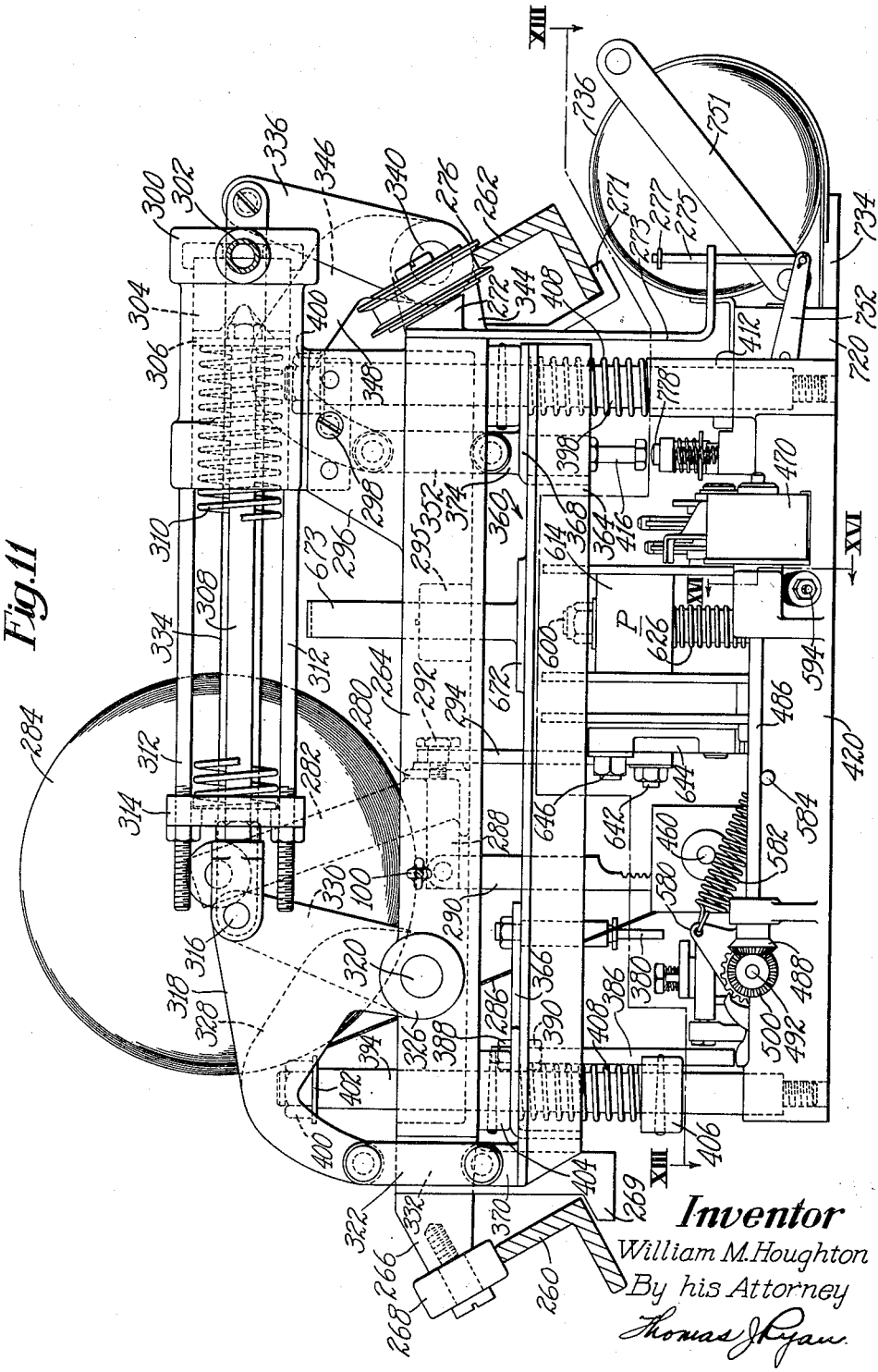

Oct. 26, 1954  W. M. HOUGHTON  2,692,539
MEASURING AND MARKING MACHINE FOR SHEET MATERIAL
Filed April 5, 1951  13 Sheets-Sheet 7

Inventor
William M. Houghton
By his Attorney
Thomas J. Ryan

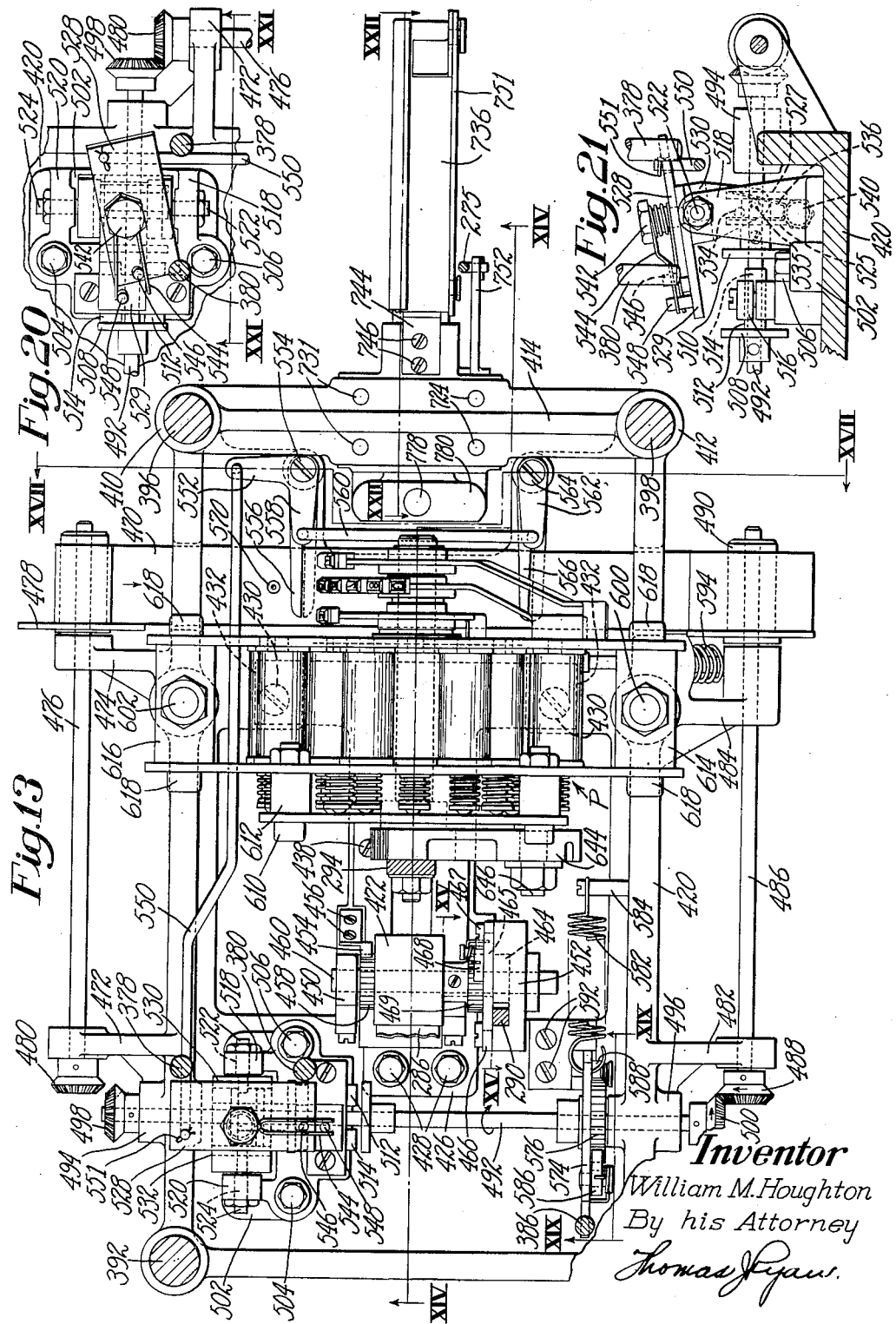

Oct. 26, 1954 W. M. HOUGHTON 2,692,539
MEASURING AND MARKING MACHINE FOR SHEET MATERIAL
Filed April 5, 1951 13 Sheets-Sheet 9
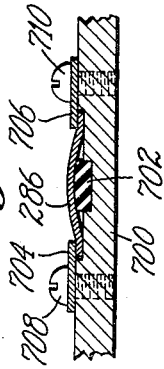
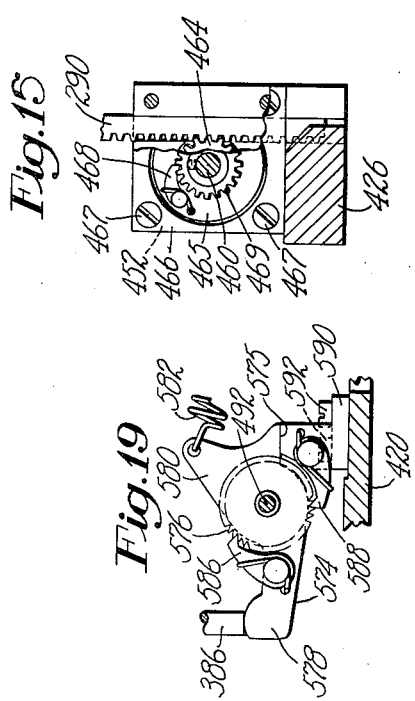
*Inventor*
William M. Houghton
By his Attorney
Thomas J. Ryan Oct. 26, 1954      W. M. HOUGHTON      2,692,539
MEASURING AND MARKING MACHINE FOR SHEET MATERIAL
Filed April 5, 1951      13 Sheets-Sheet 10
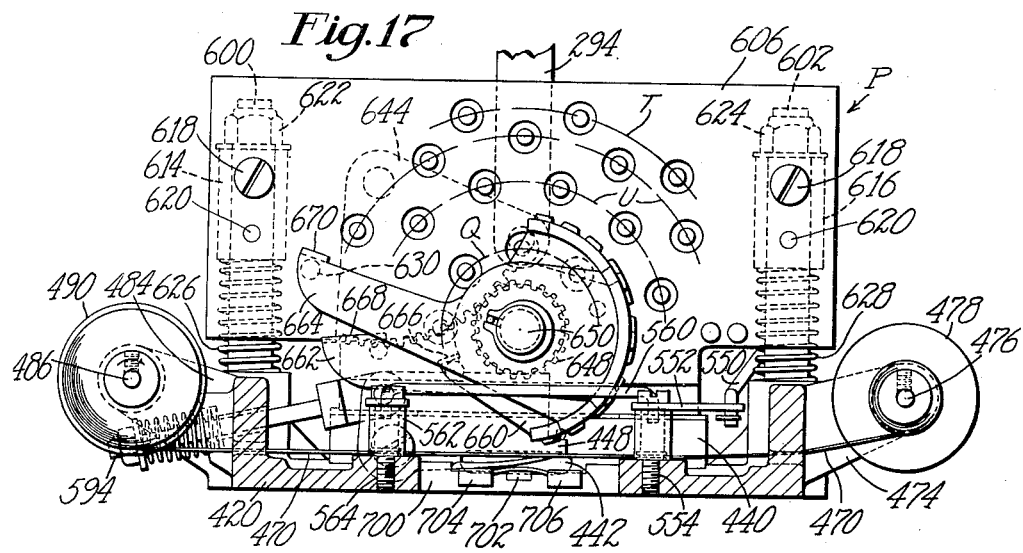
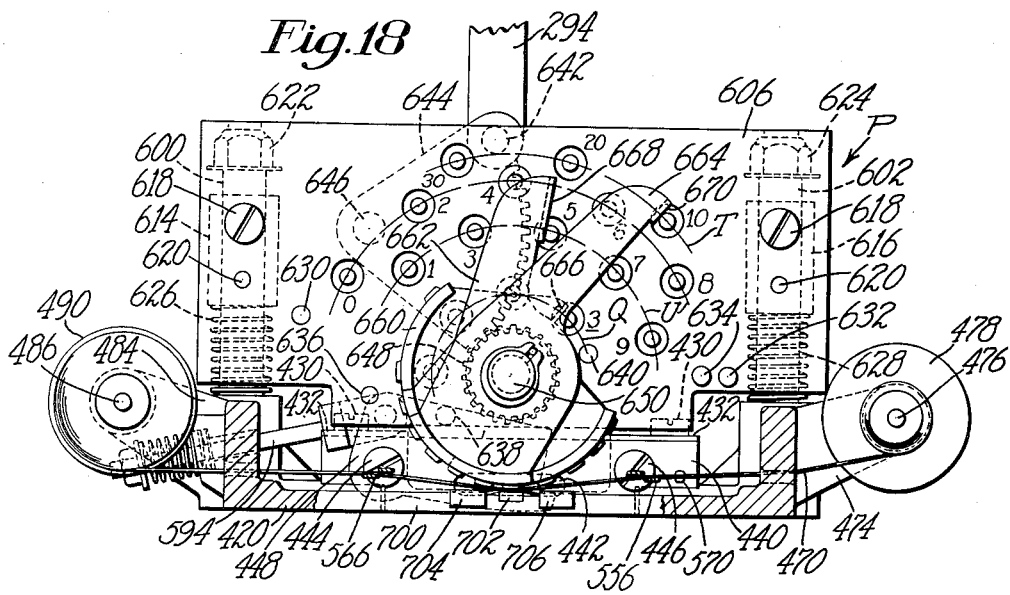
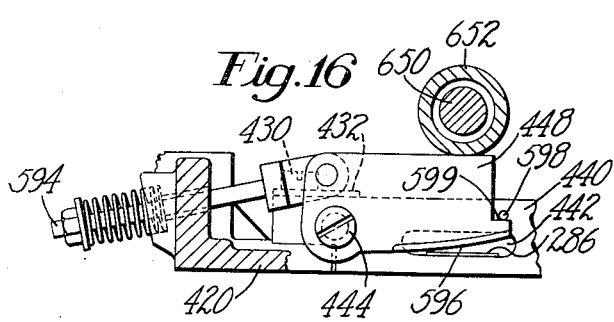
*Inventor*
William M. Houghton
By his Attorney
Thomas J. Ryan

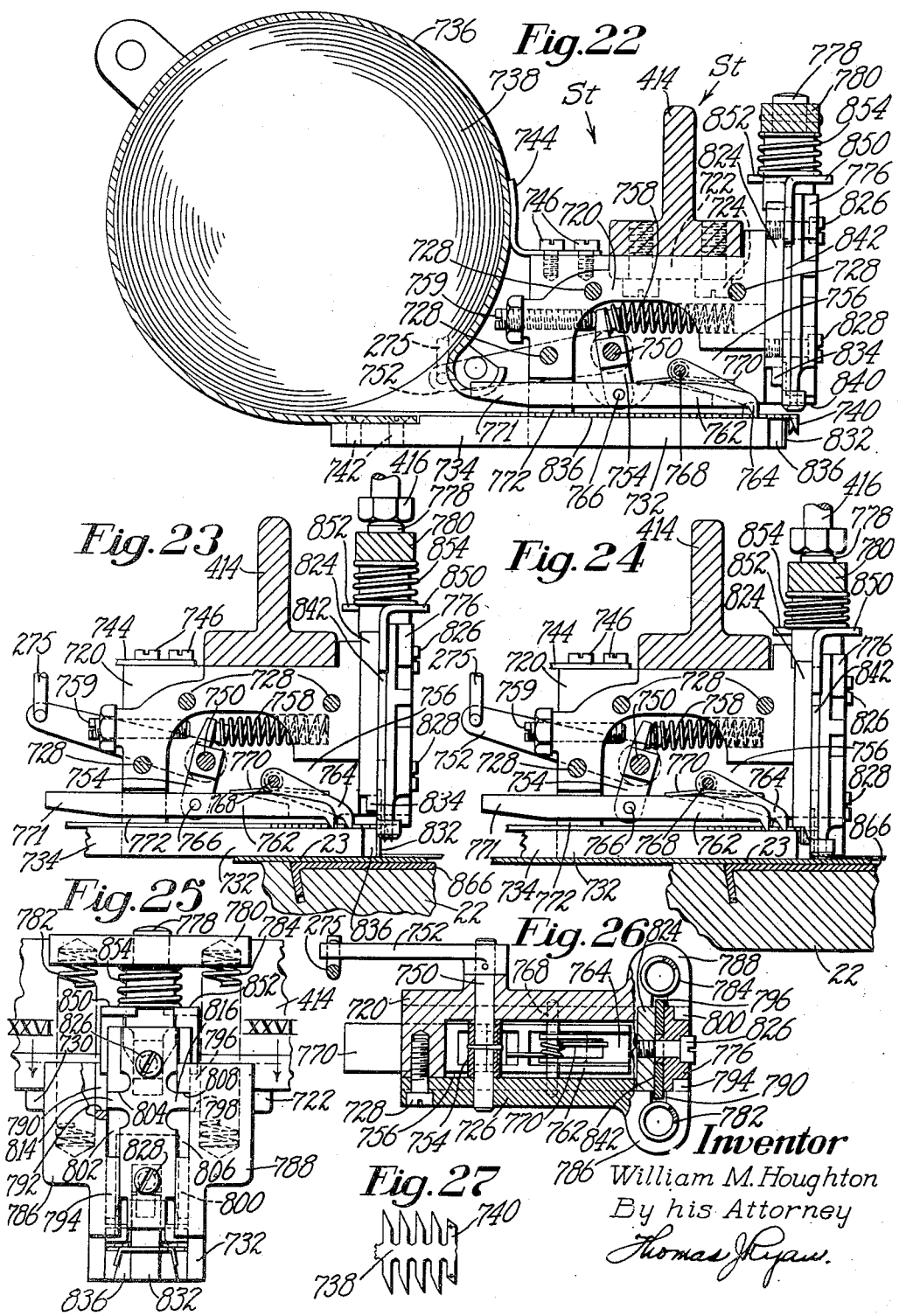

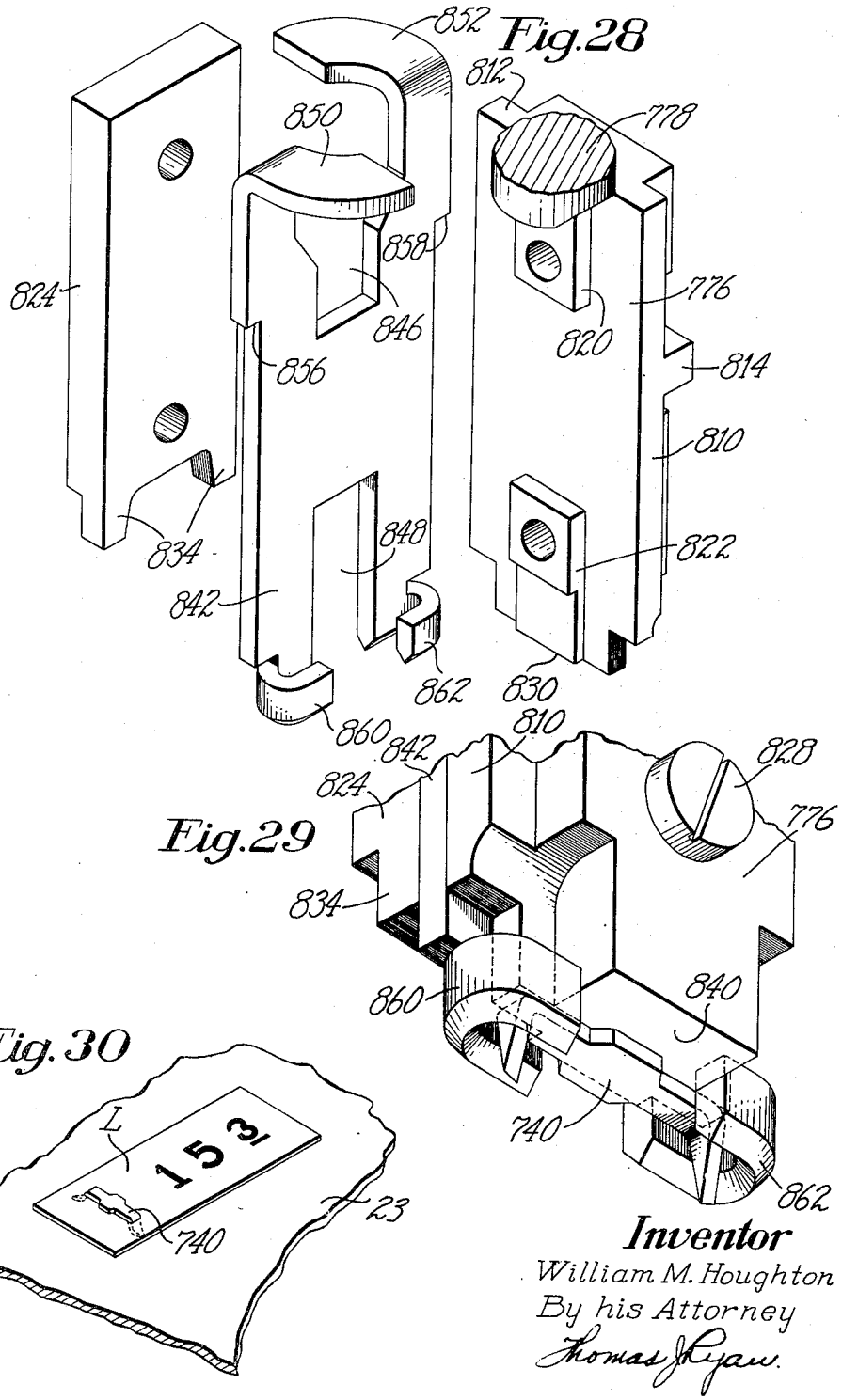

Patented Oct. 26, 1954

2,692,539

UNITED STATES PATENT OFFICE 2,692,539

MEASURING AND MARKING MACHINE FOR SHEET MATERIAL

William M. Houghton, Marblehead, Mass., assignor to United Shoe Machinery Corporation, Flemington, N. J., a corporation of New Jersey Application April 5, 1951, Serial No. 219,346

15 Claims. (Cl. 93—88)

This invention relates to improvements in work measuring machines such as those of the type known as the Sawyer or Ramsdell area measuring machines, and more particularly to an improved machine for measuring and marking sheet material such as hides and skins including mechanism for automatically placing a label on each work piece indicating or recording the result of the measurement.

Leather area measuring machines as generally used in the tanning industry are, broadly considered, of the type shown in the patents to W. A. Sawyer No. 329,597 and L. O. Ramsdell No. 931,144. These machines have been modified in many specific details since their introduction into industry and, in many instances, now include additional features. Some features such as pinwheel measuring wheels, shown in the Patents Nos. 1,046,655 and 1,474,385, granted to G. A. Schettler, have been adopted in some countries and not in others.

These machines, considered broadly and whether or not they include the additional features above referred to, conventionally include a closely arranged group of parallel and rotatable measuring wheels under which leather is driven by a power rotated bed roll. In so far as is necessary in describing such machines with relation to the present invention, it is sufficient to state that the degree of rotation (effective for measurement of the work area) of all the measuring wheels is transmitted by suitable mechanism to a pivotally mounted beam provided with a toothed sector and that the teeth of the sector mesh with the teeth of a small pinion gear fixed to the shaft or hub of an indicating device. The degree of rotation of this shaft or hub is taken as a measurement, in whatever units selected, of the area of each work piece passed beneath and in contact with the measuring wheels. The indicating device usually takes the form of a graduated dial and a cooperative pointer mounted on the shaft or hub referred to. A resetting shaft is also provided on such machines so that the indicating device or pointer is returned to zero, after each measuring operation has been completed, as a preliminary step for the measurement of the next work piece. The above brief description pertains to the usual form of measuring machine to which the present invention may be applied but it will be understood that the invention may also be used in connection with other types of work measuring machines in which the extent of some motion is an indicia of measurement.

As machines for measuring the areas of consecutively presented work pieces are customarily used, one operator standing in front of a machine spreads and feeds a given work piece beneath the measuring wheels and calls out the area reading as taken from the indicating device. A second operator standing at the rear of the machine receives the discharged work piece and marks it as he hears and understands the call from the first operator. Errors and misunderstandings often occur in the use of such a system and efforts have been made automatically to mark the area measurements on the work pieces and thereby avoid the difficulties above mentioned as well as eliminate manual labor. Such an effort is taught in the Patent No. 1,595,465, granted to D. E. Harding. In such efforts, the work pieces are marked or stamped with ink—but the results have not proved satisfactory for a number of reasons. Fibers or dust from the work often clogs or mats the stamping or marking device. If the marking device is kept clean the marks on the work are nevertheless somewhat indefinite as the fibrous structure as well as the oily content of leather prevents good printing. The selection of inks for the various leathers or other materials to be measured is difficult and further complexities arise because contrasting colors or shades of ink must be used when the materials to be measured or their colors are changed, and if one ink adheres satisfactorily to a particular material it will not necessarily give clear definition on another material.

It is an object of this invention to provide improvements in a machine for measuring sheet materials in which the above-mentioned difficulties are avoided. A further object is to provide a measuring machine for sheet materials such as hides or skins by which the measurements, as made on consecutively presented work pieces, automatically are printed on labels and the latter attached to the corresponding work pieces.

To this end, and in accordance with an important feature of the present invention, a mechanism for printing characters on labels in accordance with measurements and applying the labels to consecutively fed work pieces is cooperatively associated with a measuring machine. Another feature is a manually movable carriage whereby a restricted area of each work piece may be selected during the measurement and upon which area it be desired that the label be attached as a record. One other feature is a circuit selector by means of which a measurement made by a measuring machine is electrically transmitted to a printer. Still another feature is a mechanism for automatically resetting a measuring machine including a printer and stapler to place it in readiness for a repetitive operation.

These and other important features of the invention will be described in detail in the specification and pointed out in the appended claims.

In the drawings,

Fig. 2 is an enlarged view of some of the details of the machine as shown in Fig. 1 with intermediate portions omitted and as seen from the front of the machine;

Fig. 3 is a sectional view along the line III—III in Fig. 2;

Fig. 4 is an enlarged view of some of the parts as seen in Fig. 1 but with those parts as located during a different portion of the cycle of operation;

Fig. 5 is an enlarged side view of details pertaining to a totalizing mechanism located at the top of the machine and as seen in Fig. 1;

Fig. 6 is a sectional view along the line VI—VI of Fig. 5 looking from the front of the machine;

Fig. 7 is a sectional view along the line VII—VII of Fig. 5 looking from the front of the machine;

Fig. 8 is a view similar to that of Fig. 7 but with some parts rotated to different positions;

Fig. 9 is an enlarged sectional view along the line IX—IX of Fig. 7;

Fig. 10 is a view in the direction of the arrow X in Fig. 1 showing the marking and labeling mechanism and drawn to an enlarged scale but with the rear side of the mechanism shown to the right;

Fig. 11 is a view along the line XI—XI of Fig. 10 showing the marking and labeling mechanism in raised position;

Fig. 13 is a sectional view along the line XIII—XIII of Fig. 11 drawn to a larger scale;

Fig. 14 is a sectional view along the line XIV—XIV of Fig. 13;

Fig. 15 is a sectional view along the line XV—XV of Fig. 13;

Fig. 16 is a sectional view taken along the line XVI—XVI of Fig. 11;

Fig. 17 is a sectional view along the line XVII—XVII of Fig. 13 with the parts in raised or non-printing positions;

Fig. 18 is a view similar to that of Fig. 17 but with the printing elements in lowered or operative positions and some parts being omitted;

Fig. 19 is a view of means for driving the ribbon, taken along the line XIX—XIX of Fig. 13;

Fig. 20 is a view of details shown in Fig. 13 but with different operative positions for the parts;

Fig. 21 is a sectional view along the line XXI—XXI Fig. 20;

Fig. 22 is a sectional view along the line XXII—XXII of Fig. 13 drawn to an enlarged scale and showing the parts in starting positions with a cover plate removed;

Fig. 23 is a partial showing of details shown in Fig. 22 but with operative parts in intermediate positions (beginning to drive a staple);

Fig. 24 is a view similar to Fig. 23 but with the parts in positions assumed at a later stage in the operative cycle (at the completion of a driving operation);

Fig. 25 is an end view of the parts as shown in Fig. 22 with a small section broken away;

Fig. 26 is a sectional view partially along the line XXVI—XXVI of Fig. 25 but the major portion being broken away at a slightly lower plane;

Fig. 27 is a view of a short length of staples with the points of one staple bent into the shape assumed upon being driven;

Fig. 28 is an exploded view of driven parts of the stapler mechanism;

Fig. 29 is a perspective view of the lower ends of the parts shown in Fig. 28 drawn to a larger scale, in assembled relation, and with a sheared staple in position to be driven;

Fig. 30 is a perspective view of an edge of a work piece with an area marking as placed upon it by means of the apparatus of the present invention;

Fig. 31 is an enlarged sectional view along the line XXXI—XXXI of Fig. 14; and

Figure 1:
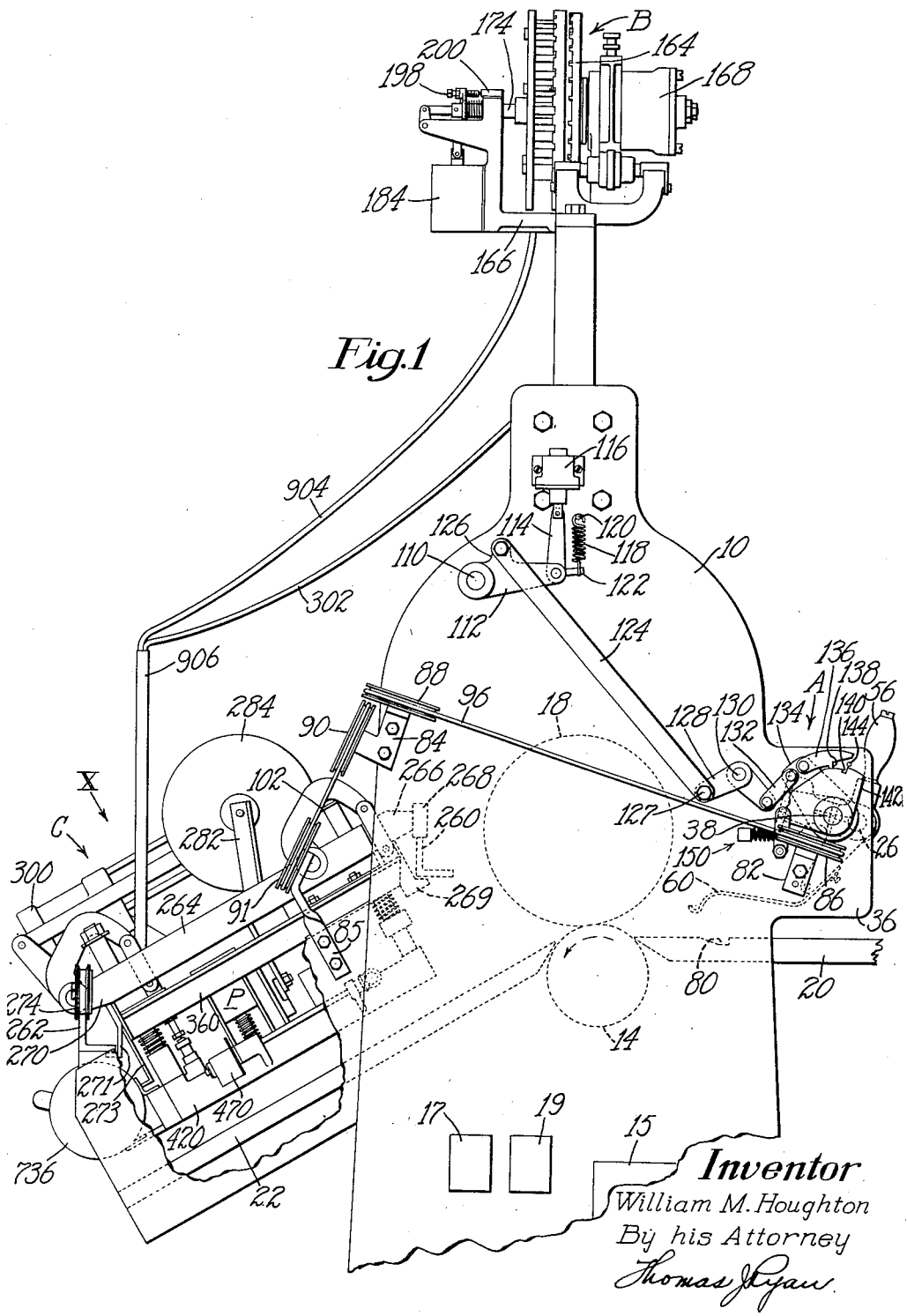
Fig. 1 is an elevation view, with parts broken away for better illustration, of the major portion of the left-hand side of a machine in which the present invention is embodied.

The present invention is shown as embodied in a mechanism installed on a leather measuring machine of the Sawyer type but of the type provided with pin-wheel measuring wheels as heretofore referred to. Such a machine is provided with a main frame having two side standards 10 and 12 (Figs. 1-4) and upon which frame is mounted a power driven bed roll or work support 14. The bed roll is adapted to be constantly driven, the direction of rotation being as shown by the arrow in Fig. 1. In the present instance, the bed roll 14 is provided with annular grooves (not shown) to receive annular rows of pins 16 (Fig. 3) of individually rotatable work measuring wheels 18 mounted in parallel relation and directly above the bed roll. These pins and wheels do not form a part of the present invention but the pins are employed when the machine is of the pin-wheel type as disclosed in Patent No. 1,046,655 heretofore referred to. A horizontal work table 20 is provided for presenting consecutive work pieces in a spread-out condition to the bite between the bed roll 14 and the series of measuring wheels 18. A rearwardly inclined table 22 supports all or a portion of each work piece 23 (Fig. 3) after it has been measured and while it is being acted upon by the instrumentalities of the present invention. A box 15 for the electrical controls and two fluid pressure control valves 17 and 19 are diagrammatically shown in Fig. 1 as positioned on the standard 10.

In the conventional machine, as heretofore widely used in the industry, a shaft is mounted to drive a pointer with relation to a dial and thereby indicate the units of area of each work piece passed through the machine. Such a dial may be retained on a machine utilizing the present invention but a dial is not essential and is not disclosed in the embodiment shown in the drawings. The dial shaft or its equivalent is retained and its extent of rotation is proportional to each area measured. This shaft is considered herein as part of a "totalizing mechanism" (totalizing the units of area of each work piece) mounted at the top of the machine and indicated at B in Fig. 1.

There are three main mechanisms or assemblies which, considered together and when mounted on a leather measuring machine, constitute a cooperative unit for carrying out the purposes of the present invention. One mechanism A (Fig. 1) is provided with a handle and is both manually and power operated. It is mounted across the front and on the left-hand side of the machine. A second mechanism B (Fig. 1) at the top of the machine is the totalizing mechanism referred to above. The third mechanism C (Fig. 1) is a movable carriage and associated parts mounted at the back of the machine, this carriage serving as a mounting for a tape feeder, a tape cutter, a ribbon feeder, a printer and a stapling device.

The mechanism A includes a bar 24 (Figs. 2 and 3) with a rectangular cross section and a round rod 26 arranged parallel to the bar and both extending almost the full distance between the standards 10 and 12. The bar 24 and rod 26 are joined by two end members 28 and 30 (Fig. 2) each located just within a standard 10 or 12. The ends of the bar 24 are attached to the members 28 and 30 by bolts 32 and 34 respectively. The ends of the rod 26 are pinned to the members 28 and 30. The standard 10 is provided with a forward extension plate 36 with a hub in which is journaled a short shaft 38. One end of the shaft 38 is pinned to the member 28. A short shaft 40 (Fig. 2) is pinned to the member 30 and is journaled in an extended portion 42 formed on the standard 12. Freely and longitudinally slidable on the tiltable rectangular structure made up of the members 28 and 30, bar 24 and the rod 26 is a bifurcated member 44 having an arm 46 extending rearwardly (Fig. 3) with two rollers 48 and 50 supported thereby and in rolling contact relation with the top and bottom sides of the bar 24. The rollers are mounted on studs 52 and 54. A handle 56 is fixed in an upwardly extending position to the top of the bifurcated member 44. A curved plate 60, preferably of plastic, is pivotally mounted on studs 62 and 64 (Fig. 2) threaded into and extending through depending arms of the bifurcated member 44. One of these depending arms is provided with a pin 66 extending within the member 44 and a coiled spring 68 is mounted, under tension, with one end connected to the pin 66 and the other end to the upper portion of the curved plate 60. A flanged or U-shaped plate 70 is attached to both depending parts of the member 44 and supports a microswitch 72 in operative relation with an adjustable contactor 74 fixed to the plastic plate 60. One end of the curved plate 60 (which functions as a feeler device) is curved at 76 to form a smooth contact with the surface of work, such as work piece 23, to be measured. If no work is present on the table 20, then the curved end 76 is arranged to extend into a recess 80 formed in and along the full width of the table 20. This recess insures an adequate vertical and horizontal range of action for the feeler device or plate 60 regardless of the thickness or width of the work 23.

The left-hand side of the machine frame standard 10, Fig. 1, is provided with three brackets 82, 84 and 85 upon which are mounted pulleys 86, 88, 90 and 91. The right-hand side of the standard 12 is similarly provided but only two of the pulleys thereon (92 and 94) are shown (Fig. 2). One end of a flexible cable 96 is attached to the handle member 44 by a hook 98 (Fig. 2) and the cable passes around the pulleys 86, 88 and the two pulleys are not shown but provided on the right-hand side of the machine (similar to the pulleys 90 and 91). The other end of the cable 96 is attached by means of a hook 100 (Fig. 10) to a main frame of the mechanism C or movable carriage heretofore referred to. A second cable 102 is joined to the handle member 44 by a hook 104 (Fig. 2) and passes around pulleys 92, 94, 90 and 91 to a hook 106 (Fig. 10) on the carriage.

As in conventional machines of the type herein considered, a shaft 110 (Fig. 1) is provided for resetting the totalizing mechanism B to zero preliminary to measurement of the next work piece. This shaft is operated, according to the present disclosure, by a novel mechanism which is automatic. The shaft 110 projects slightly from the left-hand side of the machine frame or standard 10 and a lever 112 is pinned thereto. The end of the lever 112 is pivoted to a vertical link 114 which in turn is pivoted to the piston rod of a fluid-driven motor 116 mounted on the standard 10. A coil spring 118 connects a fixed pin 120 on the standard to a pin 122 projecting from the lower end of the link 114. One end of a long link 124 is pivoted to a short arm 126 of the lever 112 and the opposite end is pivoted at 127 (Figs. 1 and 4) to one arm of a bell crank 128 journaled on a shaft 130 projecting from the standard 10. The other arm of the bell crank 128 is connected by means of a link 132 to the upper end of a plate or lever 134 mounted for free rotation on and with respect to the shaft 38. A finger 136 is pivoted to the lever 134 and is provided with a projection 138 adapted to engage a recess 140 in a plate 142 pinned to the shaft 38. A pin 144 is affixed to the standard 10 for engagement with an inclined surface 146 on the finger 136. A spring detent arrangement 150 is provided for biasing and holding the plate 142 (and the shaft 38) in either of two angular positions with respect to the standard 10.

The totalizing mechanism B (Fig. 1) is further illustrated in Figs. 5 to 9. As in conventional machines, a pivotally mounted beam 156 (Fig. 6) and toothed sector 158 are adapted to swing as a unit about a center not shown and thereby transfer a measurement from the measuring wheels 18 to a small pinion gear 160. In the present instance this gear 160 is made part of a hub 162 joined to a cam plate 164. A roughly U-shaped bracket 166 is mounted on the machine frame and the forward leg of the bracket is provided with a housing 168 for ball bearings 170 on which the hub 162 and cam plate 164 are supported for rotation, in a counterclockwise direction as viewed from the front of the machine, as a given measurement occurs. An arm 167 projects from the bracket 166 and supports an adjustable stop pin 169 which is adapted to be engaged by the beam 156 when the totalizing mechanism is set at zero. The rear leg 171 of the bracket 166 is bored at 172 slidably to receive a shaft 174 which extends through the cam plate 164 and its hub 162 and through the cap 176 of the housing 168. The leg 171 is provided with a rearwardly extending arm 178 to the end of which is pivoted a bell crank 180. One arm of the bell crank is attached by a vertical link 182 to the plunger of a solenoid 184 attached to the bracket 166. A vertical arm of the bell crank is attached by means of a link 190 to the rearwardly extending end of the shaft 174. A coil spring 192 encompasses the shaft 174 and is placed in compression between the bracket leg 171 and a collar 194 fixed to the shaft 174. The collar 194 is provided with an arm 196 supporting an adjustable screw 198 arranged to operate a micro-switch 200 affixed to the top of the leg 171. A circular switch plate 202 is placed contiguous to and parallel with the cam plate 164 and rigidly affixed to the shaft 174 by means of a back plate 204 having a hub 206 pinned to the shaft. Seventeen switches are locked in positions between the two plates 202 and 204 with the switch buttons protruding through the plate 202 as will further appear. Plates 202 and 204 are joined by means of interconnecting bolts 210 passing through the plate 204 and screwed into the plate 202. A pin 212 projects downwardly from the bottom of the switch plate 202 into a slot 214 cut in the bracket 166 preventing rotation of the switch plate 202 but permitting its motion toward and away from the cam plate 164.

In describing the arrangement of the cam plate lugs and the switches of the totalizing mechanism, a brief statement of the function of that mechanism is essential and is submitted. When a skin or hide 23 to be measured has passed through the bite between the bed roll 14 and the measuring wheels 18, the cam plate 164 takes a position to which it has been rotated by the toothed sector 158 and corresponding to the measurement. It has been found that with a cam plate diameter of 7⅝" it is suitable if the cam plate is rotated by the measuring machine in a counterclockwise direction (as viewed from the front of the machine) through an angle of 11.25° per square foot measured. With the cam plate 164 in a position corresponding with the total area measured, the switch plate 202 is adapted, by action of the solenoid 184, to move forward against the plate 164. Lugs machined on the rearward face of the cam plate 164 contact the pins or buttons of the appropriate switches electrically to convey the area measurement to appropriate solenoids in a printer in the mechanism C (Fig. 1). With the mechanism shown in the drawings the greatest measurement which may be made is 31¾ square feet measured to the nearest quarter of a square foot which is adequate for use in tanneries.

In Figs. 7 and 8 the machined lugs of the cam plate 164 are shown as sectioned. Quarter square foot indications are operated by the outer and complete ring of narrow lugs 220. As the series of 4 quarter switches 222 attached to the switch plate 202, over the measurement range, is operated 32 times, there are 32 lugs 220. In order to secure adequate switch mounting space the angle between the switch pins or buttons of the switches 222 is made not to correspond with each ¼ square foot but with 1¼ square feet or 14.0625°. Thus, as a given measurement increases and a given lug 220 leaves the ¼ square foot pin, for instance, the ½ square foot pin is engaged not by the same lug 220 but by the one next to it. There are four quarter foot switches 222 and the order of precedence in the printing is: 0, 1, 2, and 3.

The lug and switch pin relationships, if perfect machining could be achieved, should be such that if, for instance, the ½ square foot pin is engaged the ¼ square foot pin will be missed, or vice versa, when the measurement ends in ⅜ of a square foot. This is impossible in a practical sense, however, and there must be a lap resulting in regions where two adjacent switch pins are pushed. A negative lap where neither pin would be pushed is intolerable and a positive lap of .043" on the quarters circle for the leading edges of the ¼ pin and ¼ lugs has been provided. As a measurement increases, the ½ pin engages before the ¼ pin ceases to engage. No difficulty is encountered, however, for at the printer the ¼ pin takes precedence because of its location and the lap has no effect. The trailing edges of the ¼ pin and ¼ lug are the critical ones and must cease to engage at exactly ⅜ square foot. The width of the lug is then established to put the leading edge beyond its theoretical position by the mount of the lap. The same conditions obtain in the shifting from the ½ pin to the ¾ pin.

The positive lap arrangement (at the leading edges of the totalizing mechanism) above mentioned, without further provision, cannot be relied upon at the shift from the ¾ pin to the zero pin because the zero pin at the printer is encountered before the ¾ pin. The zero pin (at the totalizing mechanism) would become effective by engagement of its leading edge, which point is advanced by the amount of the lap. This would introduce an error but the difficulty is avoided electrically by placing the trailing edge of the lug in control of this shift also. Most of the switches used are single-pole and normally-open. The ¾ switch, however, is double throw and its normally-closed contact is wired in series with the zero pin circuit in such a way as to prevent closure of the latter simultaneously with the ¾ circuit. During the "lap" region where both switches are operated the zero pin circuit is opened by the ¾ switch so that the printer is controlled by the latter switch.

It is desired that the single units of square feet be printed in the order of: 0 to 9. There are therefore ten switches 224 with actuating pins in an intermediate circle corresponding with a circle of four lugs 226, 227, 228 and 229. The shifts from one figure or unit to the next take place one square foot or 11.25° apart and the center lines of the switches 224 are that distance apart. The lug width is established to give a suitable lap (.027"). The "9" switch is of double throw design and inhibits the "0," for the reason explained above in connection with the ¾ switch, and in the same manner.

The row of 10 unit switches 224 are operated by the three lugs 226, 227 and 228 through the three respective stages between 0 and 29¾ square feet. A complication arises in that the machine capacity is 31¾ square feet and not 30 and the units lug spacing does not integrate into the full 360° on the cam plate 164. The difficulty is avoided by providing a fourth lug 229 for the "30" to "31¾" readings in the units series. The lug 229 engages the switch pins of switches 224 when the lug 228 leaves them at a measurement of 29⅞ square feet. This lug 229, however, is not effective in other ranges because of the arrangement of the solenoids in the printer of the carriage in the mechanism C (Fig. 1) and the circuits leading thereto as will further appear. The arrangement referred to is such that the lower figure takes precedence—i. e., whenever two unit switch plungers are contacted, the higher is ineffective.

The electrical connections which prevent the lap from bringing the "0" in early following the "9," are not effective at a measurement of 31⅞ square feet, where the printed figure should change from 31¾ to 0. At any measurement above 31$\frac{13}{16}$ square feet, the machine records "0."

The central area of the plate 202 is greatly limited but three switches 232, 234, and 236 are retained in position by that plate and two arcuate and concentric lugs 238 and 240 on plate 164 are located for operation in that zone for transferring the tens readings. For measurements less than 9⅞ square feet these elements, of course, are ineffective. Lug 238 controls the "10" (1 in the tens position) by switch 232 and the "20" by switch 234 and its length corresponds to about 10 square feet of work measurement (the range during which either switch 232 or 234 is in use). Switches 232 and 234 are located the same distances from the center of the plate 202. Switch 236 is located a greater distance from the center and is operated by the lug 240 which is used over a range of only 2 square feet, that is, between 29⅞ to 31⅞ square feet. The length of the lug 240 is such that there is no lap at either end.

In a given measurement over 9⅞ square feet in extent, the first effective contact in the tens position involves the leading edge of the lug 238 contacting the switch 232 with no lap. If the printer solenoids were in the order of 10-20-30, the shift from "10" to "20" would be determined by the trailing edge of lug 238 which would also be required to have no lap whereas a positive lap must be provided at one end of the lug 238 as a matter of practical operation. The difficulty is avoided by reversing the order of the printer solenoids to 30-20-10, a higher figure now making the lower figures ineffective. For example, the figure "20" becomes effective when the leading edge of lug 238 (no lap) contacts the switch 234. The "10" switch may still operate but without effect and a positive lap on the trailing edge of lug 238 is therefore permissible.

The system of laps above referred to and the electrical connections further to be described provide for proper transition from one figure to another in the same series (quarters, units or tens). It is possible, however, in such a system and perhaps through very slight errors in machining, that a given measurement would terminate at a point at which the units system has shifted and the quarters has not (or vice versa). In such an event, a glaring error would be introduced. This critical situation would possibly occur only at measurements ending in ⅞ of a square foot. It is also essential that the tens series be accurately synchronized in the system.

To achieve proper synchronization of the three series a simple "give and take" mechanism is provided which has no effect unless a measurement terminates in a reading very close to ⅞ of a square foot. This mechanism comprises a ring of 16 lugs 246 integral with the cam plate 164 and a spring biased plunger 248 (Fig. 9) mounted on the plate 202 for coaction with the lugs 246. A boss 250 is formed on the plate 202 for housing a coil spring 252 confined between the head of the plunger 248 and a screw cap 254. The plate 204 is provided with an opening 256 for access to and adjustment of the screw 254. The end 258 of the plunger 248 is tapered and the slope is such as to engage an edge of one of the lugs 246 whenever a reading is close to ⅞ of a square foot and to angularly displace the cam plate 164 away from the exact ⅞ measurement. In the specific construction disclosed, the maximum angular displacement of the cam plate 164 by the plunger 248 is 0.825°. The maximum theoretical error so introduced is 0.036 square foot. While this error is insignificant, it is neutralized by arranging the lugs 246 so that the displacement of plate 164 is in one direction and in the opposite direction on alternate square feet.

When the plunger 248 comes in contact with the flat surface of a lug 246 (away from a ⅞ square foot reading), the spring 252 yields and no rotative effect is had upon the plate 164. When the plunger 248 comes between two of the lugs 246, without contacting the edge of either, then also there is no effect and the length of stroke of the plunger 248 is such that it does not strike the main body of the plate 164.

The third mechanism C (Fig. 1), heretofore referred to, pertains to a movable carriage which is more fully illustrated, in its general aspects, in Figs. 10 to 14 inclusive. Fixed to the stationary parts of the measuring machine are two angle bars or tracks 260 and 262. They are placed across the rear of the machine and above as well as parallel with the table 22. The carriage comprises a rectangular main frame or upper deck 264 having side members with L-shaped cross-sections. The forward portion of the deck 264 is provided with a projection 266 upon which is mounted a wheel 268 adapted to rest upon the track 260. The rear portion of the deck 264 is provided with projections 270 and 272 for supporting flanged wheels 274 and 276 adapted to travel on the upstanding flange of track 262. A finger 269 is attached to the forward portion of deck 264 and extends beneath the track 260 positively to retain the carriage on the track. A second finger 271 is provided at the rear of the deck 264 and cooperates with the track 262 as a positive guide. An L-shaped plate 273 is also attached to the deck 264 adjacent to the finger 271 and through the end of which a rod 275 is held in slidable relation. A snap ring 277 is attached to the top of the rod 275 as a stop means.

The upper deck 264 is provided with a transverse member 280 of L-shaped cross section to which is welded an upwardly inclined arm 282 for supporting a rotatable reel 284 for holding a roll of marking or labeling tape 286. An arm 288 is also welded to the member 280 and attached thereto is a rack 290. Beneath and in the same plane with the reel 284 is a pivot pin 292 which is threaded into the member 280 and upon which a depending link 294 is journaled. At one side of the deck 264 is a switch 295 which is arranged to be controlled by means and for a purpose to be described.

A flange 296 (Figs. 11 and 12) is fixed to one side of the upper deck 264 and bolted at 298 on the flange is an air motor cylinder 300 to which a flexible air hose 302 is connected. Within the cylinder 300 is a two-part piston made up of a main part 304 having a concavity therein (see Fig. 11) and a spring pressed cap 306 adapted to rock in the concavity. The cap 306 is fixed to a piston rod 308 which is somewhat coaxial with a compressed coil spring 310. Two threaded rods 312 extend from the cylinder 300 and adjustably support a plate 314 whereby the compression of the spring 310 may be varied. The piston rod 308 passes through and in slidable but non-contacting relation with the plate 314 and is pivoted at 316 to a plate 318 which is pinned to a shaft 320 and also pivoted to the upper end of a link 322. The shaft 320 is journaled in bosses 324 and 326 (Fig. 10) provided on the side members of the upper deck 264. Also pinned to the shaft 320 are two levers 328 and 330. One end of the lever 328 (Fig. 10) is pivoted to a link 332 (similar to link 322) and the upper end of lever 330 is pivoted to a link 334 which in turn is pivoted at its other end to the upper end of a lever 336 pinned to a shaft 340. One end of the upper deck 264 is provided with two brackets 342 and 344 in which the shaft 340 is journaled. Two levers 346 and 348 have hubs pinned to the shaft 340 and each of these levers is shaped like an inverted U as is lever 328 and to one depending leg of each is attached a link 350 or 352.

Figure 12:
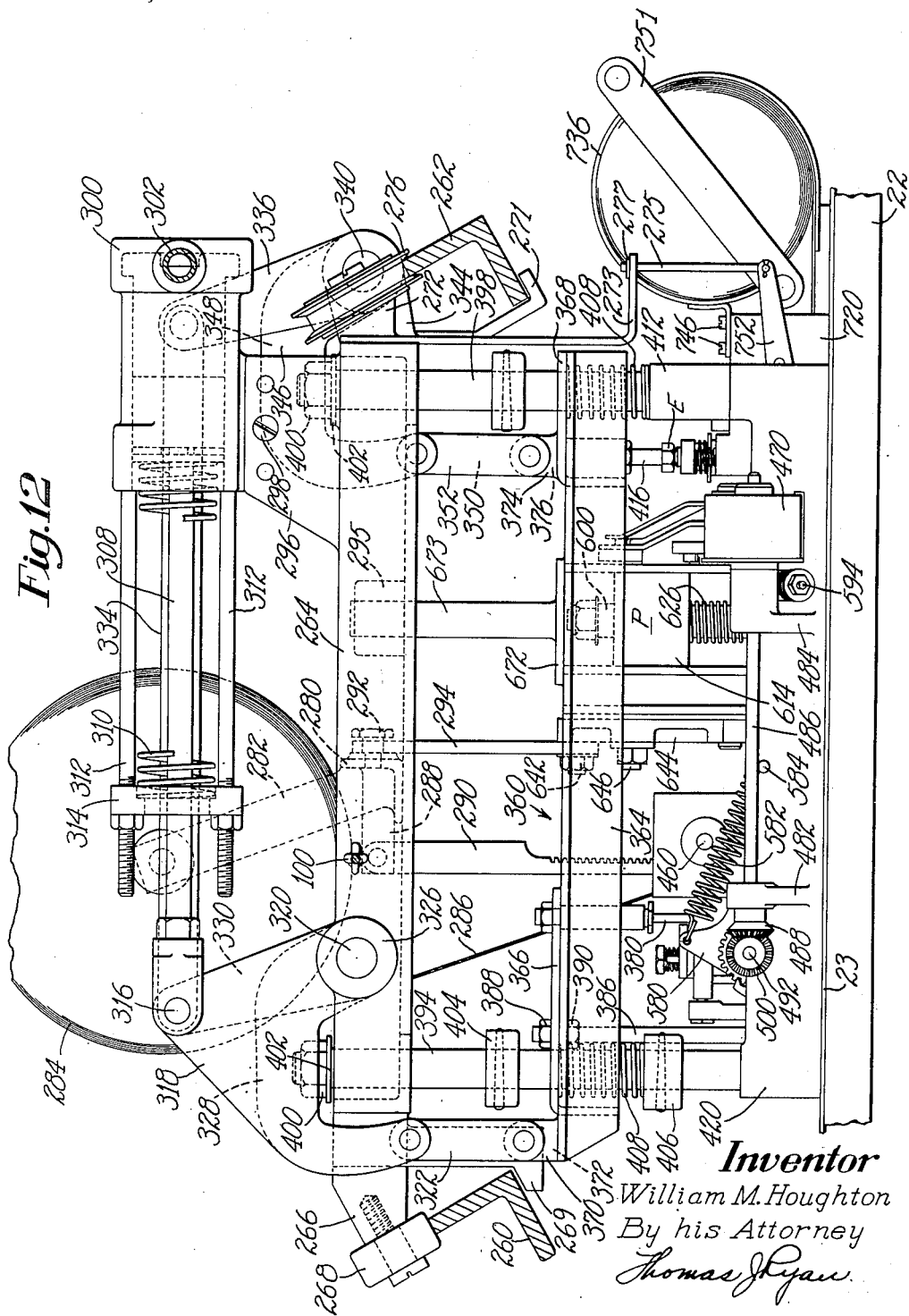
Fig. 12 is a view similar to that of Fig. 11 but with the mechanism in labeling position on a work piece.

Beneath and parallel with the upper deck 264 is an intermediate deck 360 two opposite sides of which are angle bars 362 and 364 and the ends of which are joined by flanged plates 366 and 368. The deck 360 is provided with four ears 370, 372, 374 and 376 through which pins are passed for pivotally connecting the links 322, 332, 348 and 350, respectively, to that deck. The plate 366 supports two downwardly extending pins 378 and 380 which are held in their positions by nuts 382 and 384 and a longer pin 386 held by two nuts 388 and 390. The intermediate deck 360 is movable from and toward the upper deck 264 and is guided upon such movement by four rods 392, 394, 396 and 398 passing through both of those decks. The two rods 392 and 394 are identical and each is provided with a stop nut 400 and washer 402 and collars 404 and 406 pinned in place (Figs. 11 and 12). A coiled spring 408 is mounted and under compression between the plate 366 and each collar 406. The two rods 396 and 398 are also provided with stop nuts 400 and washers 402 as well as springs 408 but the springs are mounted between the plate 368 and bosses 410 and 412 of a casting 414 (Fig. 14) which is T-shaped in cross section through which the rods are placed in fixed relation. The deck 360 also supports a depending bolt 416 attached to the flanged plate 368.

The carriage also has a third or lower deck 420 which is arranged parallel to the other two and which is supported on the reduced and threaded ends of the four rods 392, 394, 396 and 398. Normally or while the machine is not in operation the bottom of the lower deck 420 is parallel with and spaced a short distance from the work supporting surface of the work discharge table 22.

The lower deck 420 serves as a support for means or mechanism for feeding a tape, inked ribbon and staples as well as for a printer P, tape cutter and a stapler. Each of these mechanisms is considered below and with relation to other parts of the machine.

The reel 284 has heretofore been referred to as a reel for holding or storing tape 286. It is preferably of such a nature that it may be refilled quickly. The tape should be flexible, receptive to inked markings, and may be of a fibrous material such as paper or cotton. The tape 286 is led downwardly into the bite between a rubber-covered feed roll 422 (Fig. 14) and a steel roll 424 mounted in cooperative relation on a tape guiding member 426 attached to the lower deck 420 by bolts 428 and screws 430 (Figs. 13, 14 and 18). The screws 430 pass through lugs 432 which are integral with the member 426. Two brass strips 434 (only one is shown in Fig. 14) are attached to the member 426 by screws 438 to overlap slightly on and guide the tape 286. The strips 434 terminate near the edge of the member 426. A cutter block 440 with a slot 442 for the tape is attached to the lugs 432 by screws 444 and 446 (Fig. 18). The lower side of the slot 442 is in the same plane as the end of the tape guiding surface of the member 426. The screw 444 serves as a pivot for a cutter knife 448 in addition to supporting, in part, the block 440. The member 426 is provided with bearing brackets 450 and 452 (Fig. 13) for the feed roll 422 and a spring member 454 is held to the member 426 by screws 456 and engages the teeth of a ratchet wheel 458 attached to the roll 422 to rotate therewith only in one direction.

A shaft 460 of the roll 422 passes through the bracket 452 (Fig. 13) which is integral with the member 426 and this bracket is recessed slidably to receive the depending rack 290 the teeth of which are in engagement with a gear 464 on the shaft. A cover plate 466 is attached to the bracket by screws 467 and a disk 465 bears a pawl 468 (Fig. 15) biased by a spring into engagement with the teeth of a ratchet wheel 469 fixed to the shaft 460. The disk 465 is integral with the gear 464 and the two are freely rotatable on the shaft 460.

An inked ribbon 470, somewhat wider than a typewriter ribbon, is utilized in the printing operation and to this end one side of the lower deck 420 is provided with two brackets 472 and 474 (Fig. 13) through which is journaled a shaft 476. The shaft 476 carries a spool 478 fixedly attached to one end thereof for rotation therewith and upon which one end of the ribbon 470 is wound. The other end of the shaft 476 has a beveled gear 480 pinned thereto. The other side of the lower deck 420 is provided with brackets 482 and 484 through which is journaled a shaft 486 carrying a beveled gear 488 and a ribbon spool 490. In the same plane with the two shafts 476 and 486 is mounted a third shaft 492 which is journaled in bosses 494 and 496 integral with the side members of the lower deck 420. The shaft 492 has two beveled gears 498 and 500 pinned thereto and adapted for alternate engagement with the beveled gears 480 and 488 respectively as will further appear.

The shaft 492 is of such length as to be movable axially for selective engagement of the teeth in either of the sets of beveled gears (480—498 or 488—500) cooperating therewith. A bracket 502 (Figs. 13, 20, 21) is attached to the lower deck 420 by means of two bolts 504 and 506 (Figs. 13 and 20). The shaft 492 has fixed thereto two disks 508 and 510 (Fig. 21) and between those two disks and concentric with the shaft 492 are mounted two permanent and parallel magnets 512 and 514 held stationary by a capped assembly 516 (Fig. 21). The bracket 502 is also provided with two upstanding arms 518 and 520 which support pivot pins 522 and 524 upon which is tiltably mounted two plate members 528 and 529. The member 529 has two depending arms 530 and 532 (Figs. 13, 14 and 21) and arm 532 carries a pin 533 extending between two disks 525 and 527 rotatable with the shaft 492. The pin 533 also projects within the normally parallel and upstanding tines of a spring member 536 (Fig. 21) the base of which is held in position with respect to the bracket 502 by means of a bolt 540. A stationary pin 534 also projects between the tines from the arm 520. A short pin 535 extends from the arm 530 and between the disks 527 and 525 and is in alignment with the pin 533. A bolt 542 is threaded into the plate member 529 and retains a tined spring member 544, the normally parallel tines of which enclose two pins 546 and 548. The pin 546 is fixed to the plate member 528 which is rotatable about the bolt 542 and the pin 548 is fixed to the non-rotatable plate 529. The upturned end of a rod 550 passes loosely through and near one end of the rotatable plate 528 and bears a cotter pin 551 to hold it in place. The rod 550 extends rearwardly of the machine and is pivotally attached to one arm 552 of a three-armed lever rotatably held on a pin 554 screwed into the deck 420. A second arm 556 is slit lengthwise so that the ribbon 470 is adapted to pass through it, as shown. A third arm 558 of the three-armed lever (Fig. 13) is pivotally attached to a rod 560 which is similarly joined to a two-armed lever 562 mounted for rotation on a pin 564. The lower arm 566 of the two-armed lever is slit as is the arm 556 to receive the ribbon 470. Near each end of the ribbon 470 is attached an eyelet 570 for contact with the slit arms 556 or 566. Only one eyelet 570 is shown in Figs. 13 and 18, as most of the ribbon is wound on the spool 490 as the apparatus is drawn.

Freely mounted on the shaft 492 is a two-armed plate member 574 (Figs. 13 and 19) and contiguous to the plate is a ratchet wheel 576 which is keyed to the shaft 492. One arm 578 (Fig. 19) of the plate 574 is adapted to be contacted by the depending pin 386 which is attached to the intermediate deck 360. The other arm 580 of the plate 574 is connected to a coil spring 582 the other end of which is attached to a pin 584 fixed to the lower deck 420. Plate 574 is provided with a stop shoulder 575 which is adapted to engage a portion of a bracket 590. A pawl 586 is pivoted to an intermediate portion of the arm 578 and is urged by means of a spring into engagement with the teeth of the ratchet wheel 576. A second pawl 588 is pivoted to the bracket 590 which is attached by means of bolts 592 to the deck 420. This pawl is also biased by means of a spring into engagement with the teeth of the ratchet wheel 576.

The cutter knife 448 heretofore referred to (Fig. 16) rotates with the screw 444 serving as a pivot and the upper edge thereof is held in contact with a portion of the printer P by a spring actuated plunger 594 pivoted to the knife and acting from the deck 420. The knife is provided with an arcuate cutting edge 596 passing across the slot 442 of the cutter block 440. A stop pin 598 projects from the block 440 and is adapted to engage a shoulder 599 on the knife.

The printer P is supported on the lower deck 420 and is vertically movable with relation thereto on two upstanding rods 600 and 602 which are attached to the side members of the lower deck 420. The printer P is made up of a number of solenoids S (Fig. 14) which are retained in place between two plates 604 and 606. The plungers of the solenoids S are urged to the left, as viewed in Fig. 14, by springs and their motion to the left is limited by a plate 608 which is held in place with relation to the plate 604 by suitable bolts 610 and spacers 612. The plates 604 and 606 are held in spaced relation by the solenoids S and also by two blocks 614 and 616 through which pass the rods 600 and 602 respectively. Screws 618 and pins 620 are shown holding the plate 606 to the blocks 614 and 616 and similar fastening means are provided for the plate 604. The rods 600 and 602 are provided with stop nut and washer sets 622 and 624. A coiled return spring 626 is placed under compression between the lower deck 420 and the block 614 and a spring 628 is similarly held beneath the block 616. The plate 606 is perforated in three places on a circle T (Figs. 17 and 18) and in ten staggered places on two intermediate circles U as well as in four places on a smaller circle Q. These perforations are in accordance with the placement of the solenoids S in the printer and permit the plungers of the solenoids S to project from the plate 606 when the solenoids are energized. The tens solenoids are on circle T and are located from right to left as viewed in Fig. 18 to be in accordance with the readings 30, 20 and 10. The staggered arrangement of solenoids on the two circles U are in the order of 0 to 9 as viewed from left to right in Fig. 18. The quarters are in the order of —, 1, 2 and 3, as viewed from left to right on the circle marked Q in Fig. 18. Stop pins 630, 632 project from the plate 606 on the circle T. Similar pins 634, 636, 638 and 640 also project from the plate 606 to serve as limit stops, as will further appear.

The link 294, which depends from the upper deck 264, is pivoted at 642 (Fig. 18) to a geared segment 644 which in turn is pivoted at 646 to the plate 608. The teeth of the segment 644 engage the teeth of a gear 648 which in turn is pinned to a shaft 650 which is concentric with the circles T, U and Q. The shaft 650 is supported on roller bearings within a cylindrical member 652 (Fig. 14) which passes through the two plates 604 and 606 and is retained in place by snap rings 654 and 656. The member 652 constitutes the part of the printer which is in contact with the knife 448 (Fig. 16). The shaft 650 extends rearwardly (on the measuring machine) from the plate 606 and carries thereon in frictional engagement therewith three type sectors 660, 662 and 664 which are located directly above the inked ribbon 470. The frictional engagement of each of the type sectors is maintained by resilient collars and the type sectors rotate with the shaft 650 due to the friction and each of the type sectors may be stopped independently of the others. The "quarters" type sector 660 is provided with a flange 666 which extends into the path of the solenoid plungers projecting in the circle Q. The units type sector 662 is provided with a broad flange 668 which projects into the paths of the solenoid plungers emerging in the two circles U. The type sector 664 for the tens carries a flange 670, which is adapted to strike any solenoid plunger emerging from the plate 606 in the circle T. It will be noted that the printer P is capable of motion on the rods 600 and 602 toward and from the lower deck 420 due to the compression and extension of the two coil springs 626 and 628.

Fig. 17 shows the printer with its type sectors in 0 position, i. e. at the beginning of each printing stroke. The flange of each type sector is against its zero stop pin and is in position subsequently to engage a solenoid plunger lying in its path corresponding to whatever character on that sector is to be printed. Thus, the first projecting plunger encountered upon rotation of the shaft 650 determines the character printed and any projecting plunger further along the path of the arm or type sector has no effect. The quarters are printed in order of precedence of the solenoids: 0, 1, 2, 3, and each figure has a line under it to indicate that it is a number of quarters. The dash is preferably used in place of a blank for integral square feet, so that if a blank appears on a label it will indicate a malfunction. All sectors fail to print either if they have not moved at all, or if they make a full stroke without encountering a plunger, thus showing up a solenoid failure or an open circuit of the electrical system to be described. In Figs. 8 and 18, the totalizing mechanism and the printer are set to print 15¾ as the measurement.

A plate 674 (Fig. 10) is fixed to the upper surface of the angle bar 362 and projects inwardly a short distance above the plates 604 and 606 of the printer P. The plate 674 carries an arm 673 (Figs. 10, 11 and 12) which extends upwardly to overlie the switch 295 which it is adapted to operate. A plate 672 (Fig. 10) is similarly attached to the intermediate deck and likewise extends a short distance over the plates 604 and 606.

The interior bottom section of the lower deck 420 (Fig. 14) is recessed to accommodate the member 426, the cutter block 440 and a space for the knife 448 and this recess is determined at one side by a flat portion 700 (Fig. 31) which is integral with the deck 420. This portion is recessed across its top freely to receive the tape 286 and a resilient rubber strip 702 is so placed as to arch the tape upward slightly. Two brass strips 704 and 706 are attached to the portion 700 by screws 708 and 710 to serve as guides for the tape. The ends of the strips (Fig. 14) nearest the knife 448 are bent upwardly and the other ends are bent downwardly at the other side of the portion 700. The flat portion 700 and the rubber insert 702 support the tape 286 for the printing. It will be noted that the rubber insert 702 is directly beneath the inked ribbon 470.

Beneath the casting 414 of T-shaped cross-section is attached the stapler S*t* (Figs. 14 and 22 to 26). A main block 720 of the stapler is provided with a flange 722 (Fig. 14) through which screws 724 are passed to fix the stapler block in position on the carriage C. A side plate 726 (Fig. 26) is attached to the block 720 by three screws 728 and a flange 730 (Fig. 25) on the side plate is fastened in place by screws 731 (Fig. 13) to the casting 414. A bottom plate 732 forms an integral part of the stapler block 720 and extends rearwardly at 734 as a partial means of support for a refillable casing or magazine 736 in which a loose coiled strip 738 of joined staples 740 is placed. Screws 742 (Fig. 22) hold the magazine 736 to the extension 734. The magazine is also supported by a metal strip 744 and screws 746 screwed into the top of the stapler block 720. The magazine 736 is provided with a closing bar 751.

The block 720 and also the side plate 726 serve as journals for a shaft 750 (Fig. 26) to which is pinned a one-armed lever 752 and also a two-armed lever 754. The end of the lever 752 is pivoted to the rod 275 the upper portion of which is mounted in limited slidable relation with the upper deck 264. The block 720 is recessed at 756 to provide room for the two-armed lever 754 as well as a coiled spring 758 acting against one arm of the lever and bifurcated staple engaging fingers 762. An adjustable screw stop 759 is provided to limit the swing of the lever 754. The finger 762 is pivoted at 766 to the lever 754 and a finger 764 is pivoted to a rod 768 the ends of which are received in bores made in the opposing interior walls of the block 720 and side plate 726. A spring 770 is utilized to bias the bifurcated and pointed ends of the fingers 762 and 764 downwardly against the plate 732 in such a manner that finger 764 contacts the edge of one staple 740 and finger 762 contacts the edge of the subsequent staple at a time when those particular staples are unsevered from the strip 738 and their tines are not bent, as shown in Figs. 23 and 24. In Fig. 22, the fingers 762 and 764 are positioned to contact the same staple. The finger 762 is provided with a rearwardly extending arm 771 which is free to move up and down within an opening 772 formed in the block 720. It will be understood that the pivot pin 768 is fixed in position whereas the pivot pin 766 is adapted to swing with the arm 754. The arrangement of the fingers 762 and 764 is such that depression of extension 771 will lift both fingers away from the staple strip 738.

A bolt 416 has already been referred to as depending from the intermediate deck 360 and in alignment with that bolt is a driver and shearer 776 (Fig. 28) having a cylindrical top part 778 with a yoke or collar 780 pinned to a reduced portion thereof. The yoke is permanently in contact with an annular shoulder of the part 778 and is elongated with the ends recessed to receive the ends of coiled springs 782 and 784 (Fig. 25). The bottom ends of the springs 782 and 784 are received in recesses formed in protuberances 786 and 788 formed on the plate 726 and block 720 respectively. The plate 726 is grooved at 790 and is provided with a shoulder 792 and a guiding flange 794. The block 720 has a groove 796 (Fig. 26), a shoulder 798 and a guiding flange 800. The flange 794 is cut away at 802 to form an upper shoulder, not shown in Fig. 25, because it is broken away. Character 804 shows the location of this shoulder. The flange 800 is cut away at 806 to form an upper shoulder 808. The driver 776 is provided with tongues 810 and 812 (Fig. 28) for slidable contact within the flanges 794 and 800 and also with projections 814 and 816 arranged to contact the shoulders (at 804) and 808 respectively. Rectangular projections 820 and 822 are made integral with the driver 776 and serve as spacers between the driver and a bending die 824 joined to the driver by screws 826 and 828. The spacer 822 is made with a hardened lower or shearing edge 830 arranged to cooperate with a protruding rectangular portion 832 of the plate 732 to shear staples from the supply strip.

The bending die 824 is a rectangular piece of metal but the bottom thereof is provided with depending tabs 834 (Fig. 28) of the proper size and configuration to contact the tines of one staple 740 and to bend them properly for subsequent driving. A portion 836 of the plate 732 has sloping sides to cooperate with the knobs 834 in bending the tines. It will be noted that the knobs 834 are some distance above the shearing edge 830 and the driving surface 840 (Fig. 29) of the driver 776.

Between and in slidable relation with the driver 776 and the bending die 824 is a separating blade 842 notched at 846 and 848 to receive the spacers 820 and 822. The upper part of the blade 842 has arcuate tabs 850 and 852 for sliding engagement with the cylindrical part 778 of the driver. A coiled spring 854 is placed in compression between the tabs 850 and 852 and the yoke 780. The separating blade 842 is arranged to slide in the grooves 790 and 796 and is provided with shoulders 856 and 858 for cooperating with the aforementioned shoulders 792 and 798. The bottom of the blade 842 has two U-shaped members 860 and 862 for at least partially enclosing the two tines of each staple. Both bottom edges of the blade 842 are chamfered, more easily to enter the spaces between tines along the length of the staple supply strip 738.

The inclined table 22 is preferably provided with a metal plate member 866 (Figs. 23 and 24) to turn or deflect the staple tines, to withstand wear and to form a firm backing for a given work piece 23 beneath the stapler driver 776.

Figure 32:
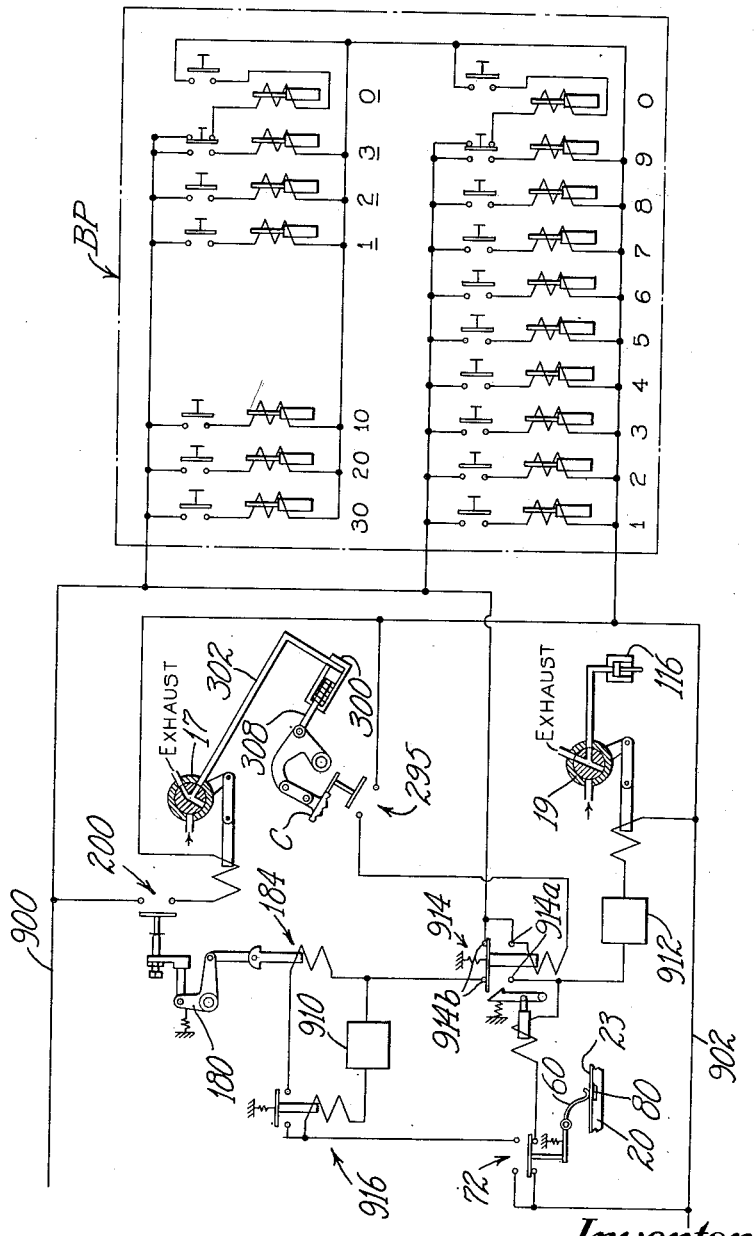
Fig. 32 is a diagrammatic showing of the electrical circuit for operating the printing, resetting and stapling mechanism.

In the electrical diagram of Fig. 32, the circuits of the totalizing mechanism B (Fig. 1) and of the printer P (Figs. 17 and 18) are shown in the dot-and-dash line block indicated as BP. These circuits are connected in parallel across the two main lines 900 and 902 with a low voltage current (24 volts). The switch controlling each of these circuits is mounted in the mechanism B and the solenoids are in the printer P. As heretofore described, the ¾ switch is a double throw switch and its normally-closed contact is wired in series with the zero circuit. The diagram of Fig. 32 shows that during a "lap" period the zero circuit is opened by the ¾ switch and the printer is controlled by the ¾ switch.

The diagram also illustrates that the "9" switch is of double throw design and controls the "0" switch during the lap period as in the case of the ¾ switch.

The valve 17 is merely shown as a rectangle in Fig. 1 but it is illustrated in Fig. 32 as a two-way or two-passage rotary valve connected to a source of fluid pressure (air) and provided with an exhaust port and a port communicating with the flexible tube or hose 302. Conveniently, the hose 302 as well as the electrical cable 904 (Fig. 1) leading from the mechanism B to the printer P are supported by a rigid conduit 906 attached to the cylinder 300 of the carriage C.

The valve 19 is also shown as a rectangle in Fig. 1 but as a two-way rotary valve in Fig. 32. One port of the valve 19 is an exhaust port, one leads to a source of fluid pressure such as an air pressure system and one port controls a pipe line 908 (Fig. 32) leading to the fluid pressure operated motor 116.

The two time-delay mechanisms 910 and 912 (Fig. 32) are provided in the control box 15 (Fig. 1) together with associated relays.

In operating the machine, a work piece 23 is spread out on the work table 20 and is fed into the bite of the bed roll 14 and the measuring wheels 18. As the roll 14 is power driven it feeds the work through the machine and the cam plate 164 is rotated in accordance with and to the extent of the measurement. As the measurement proceeds, the handle 56 is pushed rearwardly by the operator and the curved plate 60 is caused to rest lightly on the surface of the work piece (as seen in Fig. 3) and although one set of contacts is thereby closed in switch 72, no current passes (except to unlatch and open contacts 914a previously closed) as switch 914 (Fig. 32) is open. All switches and valves are then positioned as shown in Fig. 32.

After the curved plate 60 is passed by the trailing edge of the work piece 23, it drops into the recess 80 of the table 20 and the upper set of contacts in switch 72 closes. No current passes because of the operation of the time delay mechanism 910 which does not close the circuit until the trailing edge of the work piece 23 has reached the zone of the stapler, St. The circuit is then closed with the result that the contacts of a relay 916 are closed and solenoid 184 is operated to close the switch 200 and the appropriate switches in the totalizing mechanism B. Closure of switch 200 in turn causes the valve 17 to admit air under pressure to the cylinder 300 which lowers the intermediate deck 360 or causes it to approach the inclined table 22 in a direction normal thereto.

As the intermediate deck 360 moves to its lowest position, the arm 673 (Fig. 11) lowers and causes the switch 295 to close. This opens the circuit at contacts 914b of switch 914 releasing the relay 916 and latches the circuit closed across the contacts 914a. Current then passes through the time delay 912 and turns the valve 19 to operate the motor 116 and thereby reset the shaft 110 to zero (Fig. 1) and move the handle 56 forward into the position shown in Fig. 1. The time delay 912 is set to open the circuit two seconds after it is closed and this causes the relays and switches to reassume the positions shown in Fig. 32 (except for the switch 914 which remains in latched position)—i. e., become ready for the next cycle of operation or the next work piece to be measured.

The operation of the mechanical elements may be understood from the description given heretofore but a number of aspects are further explained hereinafter.

When the handle 56 is pushed rearwardly into the position illustrated in Fig. 3, the projection 138 (Fig. 4) becomes engaged in the recess 140 and the curved plate 60 (when resting on leather) is retained in position (by detent 150) to close one set of contacts in switch 72 (as in Fig. 32). When the end 76 of the plate 60 drops off the trailing edge of the work 23, then the other set of contacts in switch 72 is closed because of the action of the spring 68. When valve 19 is operated at the close of a stapling operation, motor 116 urges the finger 136 forwardly and the projection 138 is lifted out from the recess 140 by the cam surface 146 acting on the pin 144. The detent 150 will then hold the parts in the positions shown in Fig. 1—i. e., in readiness for the introduction of the next work piece.

The flexible cables 96 and 102 enable the operator to move the carriage C anywhere across the rear of the machine by means of the handle 56 so that the stapler St may act on a selected portion of the trailing end of a given work piece such as a neck or shank of a hide or skin (see Fig. 30).

The operation of the inked ribbon feeding mechanism may be understood by referring to Figs. 13, 14 and 19 to 21. The rod 386 depends from the intermediate deck 360 and as the latter lowers, the rod 386 pushes the arm 578 downwardly thereby causing the pawl 586 to slide and pawl 588 to hold with respect to the teeth on the ratchet wheel 574 (Fig. 19) and to extend the spring 582. When the deck 360 moves upwardly, the spring 582 causes the pawl 588 to slide and the shaft 492 to rotate slightly. Continuous up-and-down motion of the deck 360 thereby causes an intermittent rotation of the shaft 492 and this rotation is imparted to either the shaft 476 or the shaft 486 through the bevel gears 480—498 or 488—500. The eyelet 570 (Fig. 18) shown near one end of the ribbon 470 (one eyelet near each end of the ribbon but only one shown) is adapted to reverse the direction of the ribbon feed. The eyelet 570 will contact the slit arm 556 and through the rod 550 will cause the plate 528 to rotate into the path of the subsequently downwardly moving pin or rod 380 (Fig. 21) to be tilted thereby against the spring 536. This causes the shaft 492 to shift longitudinally and bring the gears 480 and 498 into engagement. The gears are held in engagement by the action of the magnets 512 and 514 on the disk 508. When the ribbon 470 has again run its length, the other eyelet (not shown) serves to tilt the plate 528 into the path of the rod 378 and the magnets 512 and 514 hold the disc 510 to maintain gears 488 and 500 in engagement.

The paper or cloth tape 286 is fed from the reel 284 by the action of the rack 290 (Fig. 12) as the intermediate deck 360 moves with relation to the rack. As the deck 360 moves downwardly, the gear 464 and its associated disc 465 rotate clockwise as viewed in Fig. 15 with the result that the pawl 468 rides over the teeth in the ratchet wheel 469 and the shaft 460 does not rotate because of the spring member 454. As the deck 360 rises, the pawl 468 becomes effective to rotate the shaft 460 as well as the tape feed roll 422.

The tape 286 is fed the length of a desired label L (Fig. 30) each time the deck 360 rises and, after such length emerges through the opening 642 in preparation for the next cycle of operation. When the next cycle is effected, the deck 360 descends and the knife 448 severs the tape because of the action of the member 652 of the printer P pressing down on the knife.

When the proper solenoids S of the printer P are actuated, downward motion of the deck 360 sets the printer segments 660, 662 and 664 by action of the gear segment 644 and the gear 648. The lower deck 420 first contacts the work with its broad and smooth under surfaces. When the plates 672 and 674 (Fig. 10) strike the printer P, the two springs 626 and 628 yield (Fig. 18) and the printing segments 660, 662, and 664 press the inked ribbon down and into printing contact with the tape 286.

The strip 738 of staples 740 is fed to and through the stapler St when the spring 758 urges the lever 754 in the counterclockwise direction as viewed in Fig. 22. The bifurcated finger 764 prevents movement of the staples toward the container 736 and the bifurcated finger 762 does the feeding. The extension 771 of the finger 762 constitutes a manual release of the staple strip 738 when a change or replenishment of the supply of staples is undertaken. When the extension 771 is depressed, it lifts the feeding finger 762 as well as the holding finger 764 clear of the staples as heretofore mentioned.

Consecutive staples 740 are fed to the portion 836 of the stapler plate 732 and when the intermediate deck 360 lowers in a given cycle of operation, the bolt 416 affixed thereto will strike the cylindrical section 778 of the driver 776 and the latter will descend together with the bending die 824 with the result that one staple 740 will be bent to conform with the sloping sides of the plate portion 836 to prepare it for subsequent driving and, simultaneously, the preceding staple 740 will be sheared by the cutting edge 830 and driven through or partially through the cut-off label L, into the work 23 and preferably clinched. The two springs 782 and 784 yield to permit the staple forming, shearing and driving operations and it is to be noted that the downward motion of the bending die 824 is limited by the top surface of the conformed or undriven bent staple whereas the downward motion of the driver or shearer 776 is limited by its rigid joinder to the die 824 as well as the top surface of the driven staple. The downward movement of the separating blade 842 is positively limited and is determined by engagement of the shoulders 856 and 858 on the blade (Fig. 28) with the shoulders 792 and 798 on the cover plate 726 and staple block 720 respectively. Such engagement is accompanied by a yielding of the spring 854. The separating blade 842 is constructed to contact or almost contact the label L and serves as a guiding member for the staple being driven. The curved portions 860 and 862 on the blade 842 prevent each staple as it is sheared from the strip 738 from snapping or otherwise moving out of position from beneath the driver 776.

As the intermediate deck 360 rises, the yoke 780 rises a distance determined by the projections 814 and 816 on the driver 776 striking the upper shoulders of the interrupted flanges 794 and 800. This permits feeding of the next staple 740 by the finger 762 and places the driver 776, die 824 and blade 842 in readiness to treat the next work piece.

Fig. 30 illustrates the location of the stapled label L on the trailing tab of a work piece 23, the printed measurement being 15¾ square feet and the staple 740 being at that end of the label nearest the main body of the work piece. The operator need only be reasonably accurate in placing the staple by movement of the handle 56 across the front of the machine as the label may hang over the edge of the work and the time delay mechanism 910 assures proper placement on the work along the path of work feed. The staple 740 may or may not penetrate through the work depending upon the thickness and nature of the latter, the small marks made by the staple being unobjectionable in most leathers.

The drawings disclose an apparatus in which a stapler is incorporated but it will be understood that the stapler may be omitted and a device for applying or attaching a label to the work by adhesive may be substituted without departing from the spirit of the present invention. A cloth or paper strip with a heat sensitive adhesive thereon may be supplied on a reel in place of the usual tape. The momentary contact of a metallic block heated by an electrical resistance unit with each printed label is sufficient to cause the adhesive to be activated and the label to be adequately attached to the work (preferably the flesh side) when such work is not excessively wet or of a greasy nature.

Having described my invention, what I claim as new and desire to secure by Letters Patent of the United States is:

1. A machine for measuring and marking consecutively presented work pieces of sheet material comprising an element movable in accordance with the measurement, a carriage movable across the rear of the machine, said carriage supporting label supplying means, a stapler and a printer, said printer being electrically controlled by said element to record the measurement of a given work piece on a label fed by said supplying means, and means arranged to be actuated by said work piece to initiate operation of the printer and stapler to print and attach a label as a record on said work piece.

2. A machine for measuring and marking consecutively presented work pieces of sheet material comprising an element movable in accordance with the measurement, means for feeding a work piece in spread-out condition through the machine to subject it to measurement, manual control means movable across the front of the machine, a carriage movable across the rear of the machine and connected to said manual control means for movement therewith, said carriage supporting label supplying means, a stapler and a printer, said printer being electrically controlled by said element to record the measurement of a given work piece on a label fed by said supplying means, and means for automatically operating the printer and stapler to attach a label as a printed record on said work piece.

3. A machine for measuring and marking consecutively presented work pieces of sheet material such as hides or skins with printed labels comprising an element which is rotatable in accordance with the measurement, means for feeding a spread-out work piece through the machine to subject it to measurement, manual control means movable across the front of the machine including a feeler device for contacting the work, guiding means at the rear of the machine, a carriage movable on said guiding means across the rear of the machine and connected to said manual control means for movement thereby, said carriage supporting label supplying means, a stapler and a printer, and electrical means for operating the stapler and printer including connections for transferring a measurement from said element to said printer and connections to said feeler device to determine the time of operation of the printer and stapler.

4. A machine for measuring and marking each of consecutively presented work pieces with printed labels as records of their individual measurement comprising an element which is movable to an extent dependent upon the measurement of an individual work piece fed in a given path through the machine, a carriage movable across the rear of the machine contiguous to said path, a printer on said carriage connected to said element to be set thereby, a label supplying device and a label attaching device also on said carriage, a feeler device mounted to contact a work piece being measured, and connections to said feeler device to cause the printer to print characters recording the measurement on a label from said supplying device and to cause the attaching device to attach the printed label as a recording mark on the work piece.

5. A machine for measuring and marking a work piece of sheet material comprising means for feeding a work piece through the machine and simultaneously measuring its area, an element movable in accordance with the measurement, label supplying means contiguous to the path of the work piece as discharged from the machine, a printer and stapler supported in cooperative relation with the label supplying means and in positions to act upon a label discharged from the latter, said printer being connected to said element to be set thereby, and electrical means arranged, subsequent to a measuring operation, to operate the printer and stapler to print characters on a label as a record of measurement and to attach the label on said work piece with a staple.

6. A machine for measuring and marking a hide or skin comprising measuring wheels and a bed roll for cooperating simultaneously to feed and measure a given work piece, a totalizing mechanism including an element movable in extent dependent upon the area of the work piece as measured by said wheels, label supplying means, a printer and a stapler mounted at the rear of the machine, and electrical connections to set the printer in accordance with the movement of said element to print a record of the measurement on a label and to actuate the stapler to staple the printed label on said work piece.

7. A machine for measuring and marking consecutively presented hides or skins comprising cooperating measuring wheels and a bed roll for simultaneously feeding and measuring a given work piece in spread-out condition, a table at the rear of the machine for supporting the work during discharge from between the said wheels and bed roll, a totalizing mechanism including an element movable in extent dependent upon the area of the work piece as measured by said wheels, a carriage mounted above said table, said carriage supporting label supplying means, a printer and a stapler, and electrical connections to set the printer in accordance with the movement of said element to print a record of the measurement on a label and to actuate the stapler to staple the printed label on said work piece with the said table as a backing member.

8. In a machine for measuring and marking a work piece of sheet material, the combination of means for measuring the work piece comprising an element movable in accordance with the measurement of the work piece, a printer, means controlled by said element for setting the printing elements of said printer in response to the measurement of the work piece, means for operating said printer to mark the measurement of the work piece on a label, means for attaching the imprinted label to the measured work piece, and means operative after the work piece is measured for actuating the printer and the attaching means thereby providing a measured work piece having a record of its measurement which is certain of legibility and is securely attached thereto.

9. In a machine for measuring and marking a work piece of sheet material, the combination of means for measuring the work piece comprising an element movable in accordance with the measurement of the work piece, a printer, means controlled by said element for setting the printing elements of said printer in response to the measurement of the work piece, means for operating said printer to mark the measurement of the work piece on a label, means for attaching the imprinted label to the measured work piece, and means operative after the work piece is measured for simultaneously actuating the printer and the attaching means thereby providing a measured work piece having a record of its measurement which is certain of legibility and is securely attached thereto.

10. In a machine for measuring and marking a work piece of sheet material, the combination of means for measuring the work piece comprising an element movable in accordance with the measurement of the work piece, a printer, means controlled by said element for setting the printing elements of said printer in response to the measurement of the work piece, means for operating said printer to mark the measurement of the work piece on a label, means for attaching the imprinted label to the measured work piece, and means actuated in response to the passage of the work piece being measured for causing the printing and attaching means automatically to attach a printed label upon the measured work piece thereby providing a work piece having a record of its measurement which is certain of legibility and is securely attached thereto.

11. A machine for measuring and marking consecutively presented hides or skins, having means for simultaneously feeding and measuring a given work piece, a table at the rear of the machine for supporting said work piece upon discharge, an element movable in accordance with the measurement, a printer and a stapler arranged above said table, means connecting said movable element with said printer for setting the printing elements of the printer in accordance with the measurement of the work piece, and means actuated in response to the passage of the work piece through the machine for causing the printer to print the measurement on said label and simultaneously to cause the stapler to attach the label on the work piece with said table acting as a backing member for the printing and attaching operation.

12. The machine of claim 11 wherein the means connecting the printer with the movable element and the actuating means are controlled by an electrical circuit.

13. The machine of claim 12 wherein means are provided for resetting the machine automatically in preparation for the insertion of a subsequent work piece.

14. A machine for measuring and marking consecutively presented work pieces with printed labels as records of their individual measurement having, in combination, an element which is movable proportionately to the area of an individual work piece fed in a given path through the machine, a carriage movable across the rear of the machine transversely to said path of movement, a printer, a label supplying device for presenting labels to the printer, and a label attaching device mounted on said carriage, a work detecting device arranged to activate an electrical circuit when the trailing edge of a work piece passes beneath it, said circuit having means for setting the printer in accordance with the movement of the measurement indicating element, printer operating means actuated by said circuit, and label attaching operating means also actuated by said circuit, said circuit being arranged to actuate the printer operating means and the label attaching operating means simultaneously thereby attaching a printed label upon the measured work piece as a clear record of its measurement.

15. A machine for measuring and marking consecutively presented work pieces with printed labels as records of their individual measurement having, in combination, an element which is movable proportionately to the area of an individual work piece fed in a given path through the machine, a carriage movable transversely of the rear of the machine and immediately above said path, a printer, a label supplying device, a stapler and a staple feeding device mounted on said carriage, a frame or intermediate deck mounted for vertical movement relative to said carriage, means operated in response to downward movement of the frame to cause the printer to print the measurement of a work piece upon a label and simultaneously to cause the stapler to attach the printed label to the work piece and means operated in response to upward movement of the frame to feed a staple to the stapler from the staple supplying device and a label from the label supplying device to a position beneath the printing elements, a work piece detection device, and means operated by said device to actuate an electrical circuit when the trailing edge of a work piece passes beneath said device, said circuit having means for setting the printing elements of the printer in accordance with the movement of the area indicating element and also to actuate the frame thereby causing the printed label to be attached to the measured work piece.

References Cited in the file of this patent

UNITED STATES PATENTS

| Number | Name | Date |
|---|---|---|
| 635,779 | Hunt et al. | Oct. 31, 1899 |
| 788,623 | Beals | May 2, 1905 |
| 1,029,695 | Kohnle | June 18, 1912 |

FOREIGN PATENTS

| Number | Country | Date |
|---|---|---|
| 263,535 | Great Britain | Dec. 29, 1926 |
| 620,759 | Great Britain | Mar. 30, 1949 |